United States Patent
Nagashima

(10) Patent No.: US 11,943,402 B2
(45) Date of Patent: Mar. 26, 2024

(54) IMAGE PROCESSING APPARATUS AND METHOD FOR DISPLAYING HISTORY INFORMATION

(71) Applicant: SHARP KABUSHIKI KAISHA, Osaka (JP)

(72) Inventor: Hiroki Nagashima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/954,541

(22) Filed: Sep. 28, 2022

(65) Prior Publication Data

US 2023/0115126 A1 Apr. 13, 2023

(30) Foreign Application Priority Data

Oct. 7, 2021 (JP) .................................. 2021-165492

(51) Int. Cl.
*H04N 1/00* (2006.01)
*H04N 1/44* (2006.01)

(52) U.S. Cl.
CPC ....... *H04N 1/00514* (2013.01); *H04N 1/0044* (2013.01); *H04N 1/4426* (2013.01)

(58) Field of Classification Search
CPC ............. H04N 1/00514; H04N 1/0044; H04N 1/4426; G06Q 30/0224; G06Q 30/0255; G05B 2219/24055; G05B 2219/23134; G06F 3/1273
See application file for complete search history.

(56) References Cited

U.S. PATENT DOCUMENTS

| | | | |
|---|---|---|---|
| 8,261,090 B1* | 9/2012 | Matsuoka | G06F 21/32 713/186 |
| 2009/0195819 A1* | 8/2009 | Sugimoto | G06F 3/1273 358/1.15 |
| 2010/0265547 A1* | 10/2010 | Katou | G06F 3/1258 358/1.16 |
| 2014/0176999 A1* | 6/2014 | Umezawa | G06F 3/1273 358/1.15 |
| 2018/0285824 A1* | 10/2018 | Kenthapadi | G06Q 10/1053 |
| 2019/0075460 A1* | 3/2019 | Sakamoto | H04N 1/442 |
| 2019/0312991 A1* | 10/2019 | Manabe | G06F 3/1273 |
| 2020/0159479 A1* | 5/2020 | Yoshida | G06F 3/1273 |
| 2021/0294550 A1* | 9/2021 | Sako | G06F 3/1273 |

FOREIGN PATENT DOCUMENTS

JP 2013-062871 A 4/2013

* cited by examiner

*Primary Examiner* — Juan M Guillermety
(74) *Attorney, Agent, or Firm* — ScienBiziP, P.C.

(57) ABSTRACT

An image processing apparatus including a job executer that executes a job pertaining to image processing, a storage capable of storing history information pertaining to the execution of the job by associating the history information with an executing user of the job, a display capable of displaying the history information, a recognizer that recognizes the executing user, and a controller, in which when the recognizer recognizes the executing user before the executing user is authenticated, the controller preferentially displays the history information associated with the recognized executing user on the display.

9 Claims, 19 Drawing Sheets

FIG. 3A

| SETTING HISTORY | | | | |
|---|---|---|---|---|
| HISTORY ID | EXECUTION DATE AND TIME | JOB TYPE | DISPLAYED SETTING VALUE | SETTING VALUE FILE NAME |
| 001 | 2020/02/22 20:20 | SIMPLE COPY | NUMBER OF COPIES:1, COLOR MODE:AUTO, SIZE:A4, TWO-SIDED:ONE-SIDED, MAGNIFICATION:100%, TRAY:TRAY 1, STAPLED:NEEDLELESS, ····· | 001.config |
| 002 | 2020/02/22 19:19 | COPY | NUMBER OF COPIES:1, COLOR MODE:AUTO, SIZE:A4, TWO-SIDED:ONE-SIDED, MAGNIFICATION:100%, TRAY:AUTO, STAPLE: NO, ····· | 002.config |
| 003 | 2020/02/22 18:18 | SIMPLE SCAN | NUMBER:5, DESTINATION:Yamada@sample.com, Tanaka@sample.com, TWO-SIDED:ONE-SIDED, FORMAT:PDF, ORIGINAL SIZE:A4, TRANSMISSION SIZE:A4, ORIENTATION:AUTO, RESOLUTION:200x200dpi, COLOR:AUTO, ····· | 003.config |
| 004 | 2020/02/22 18:10 | SIMPLE FAX | NUMBER:2, DESTINATION:0123456789, PLANNING DIVISION, SIZE:A4, ····· | 004.config |
| 005 | 2020/02/12 09:01 | COPY | NUMBER OF COPIES:1, COLOR MODE:AUTO, SIZE:A4, TWO-SIDED:TWO-SIDED, MAGNIFICATION:100%, TRAY:AUTO, STAPLE: NO, ····· | 005.config |
| 006 | 2020/02/11 20:30 | SIMPLE COPY | NUMBER OF COPIES:1, COLOR MODE:AUTO, SIZE:A4, TWO-SIDED:TWO-SIDED, MAGNIFICATION:100%, TRAY:AUTO, STAPLE: NO, ····· | 006.config |
| 007 | 2020/02/11 20:24 | SIMPLE SCAN | NUMBER:5, DESTINATION:Yamada@sample.com, Tanaka@sample.com, TWO-SIDED:ONE-SIDED, FORMAT:PDF, ORIGINAL SIZE:A4, TRANSMISSION SIZE:A4, ORIENTATION:AUTO, RESOLUTION:600x600dpi, COLOR:GRAYSCALE, ····· | 007.config |
| 008 | 2020/02/11 20:20 | SCAN AND SAVE | NUMBER:1, DESTINATION:STANDARD FOLDER, TWO-SIDED:ONE-SIDED, FORMAT:PDF, ORIGINAL SIZE:A4, TRANSMISSION SIZE:A4, ORIENTATION:AUTO, RESOLUTION:200x200dpi, COLOR:AUTO, ····· | 008.config |
| 009 | 2020/02/11 17:10 | COPY | NUMBER OF COPIES:1, COLOR MODE:AUTO, SIZE:A4, TWO-SIDED:TWO-SIDED, MAGNIFICATION:100%, TRAY:AUTO, STAPLE: NO, ····· | 009.config |
| 010 | 2020/02/11 13:20 | SIMPLE COPY | NUMBER OF COPIES:1, COLOR MODE:AUTO, SIZE:A4, TWO-SIDED:ONE-SIDED, MAGNIFICATION:100%, TRAY:TRAY1, STAPLED:NEEDLELESS, ····· | 0010.config |

FIG. 3B

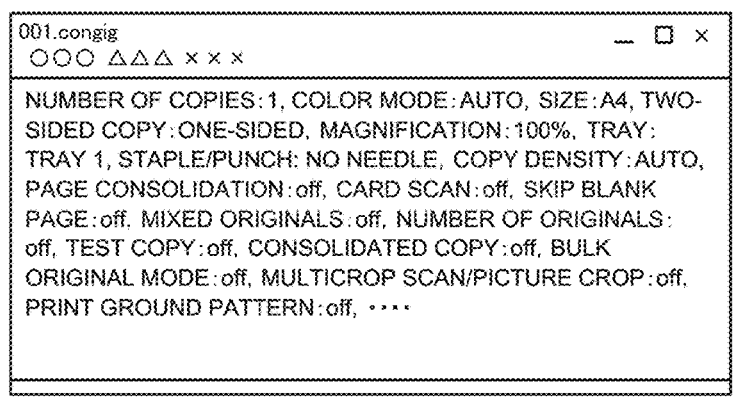

FIG. 4

| HISTORY-USER MANAGEMENT TABLE | | |
|---|---|---|
| HISTORY ID | USER NAME | USER ID |
| 001 | aaaaa | 0001@sample |
| 002 | aaaaa | 0001@sample |
| 003 | aaaaa | 0001@sample |
| 004 | aaaaa | 0001@sample |
| 005 | aaaaa | 0001@sample |
| 006 | aaaaa | 0001@sample |
| 007 | aaaaa | 0001@sample |
| 008 | aaaaa | 0001@sample |
| 009 | aaaaa | 0001@sample |
| 010 | aaaaa | 0001@sample |

FIG. 5

| JOB HISTORY | | | | |
|---|---|---|---|---|
| JOB ID | EXECUTION DATE AND TIME | JOB TYPE | USER NAME | STATUS |
| 001 | 2020/02/22 20:20 | SIMPLE COPY | aaaaa | COMPLETED |
| 002 | 2020/02/22 19:19 | COPY | aaaaa | COMPLETED |
| 003 | 2020/02/22 18:18 | SIMPLE SCAN | aaaaa | COMPLETED |
| 004 | 2020/02/22 18:10 | SIMPLE FAX | aaaaa | COMPLETED |
| 005 | 2020/02/12 09:01 | COPY | aaaaa | COMPLETED |
| 006 | 2020/02/11 20:30 | SIMPLE COPY | aaaaa | COMPLETED |
| 007 | 2020/02/11 20:24 | SIMPLE SCAN | aaaaa | COMPLETED |
| 008 | 2020/02/11 20:20 | SCAN AND SAVE | aaaaa | COMPLETED |
| 009 | 2020/02/11 17:10 | COPY | aaaaa | COMPLETED |
| 010 | 2020/02/11 13:20 | SIMPLE COPY | aaaaa | COMPLETED |

FIG. 9

| | HISTORY ID | JOB TYPE | | NUMBER OF COPIES | COLOR | SIZE | TWO-SIDED | MAGNIFICATION | TRAY | STAPLED | | |
|---|---|---|---|---|---|---|---|---|---|---|---|---|
| DEFAULT SETTINGS | 001 | SIMPLE COPY | | 1 | AUTO | A4 | ONE-SIDED | 100% | AUTO | UNSTAPLED | etc. | |
| THIS TIME SETTINGS | | | | 1 | AUTO | A4 | ONE-SIDED | 100% | TRAY1 | NEEDLELESS | | |
| DEFAULT SETTINGS | 002 | COPY | | | | | | | | | | |
| | | JOB TYPE | | NUMBER OF COPIES | COLOR | SIZE | TWO-SIDED | MAGNIFICATION | TRAY | STAPLED | etc. | |
| | | | | 1 | AUTO | A4 | ONE-SIDED | 100% | TRAY | UNSTAPLED | | |
| THIS TIME SETTINGS | | | | 1 | AUTO | A4 | ONE-SIDED | 100% | TRAY1 | UNSTAPLED | | |
| DEFAULT SETTINGS | 003 | SIMPLE SCAN | Yamada@sample.com, Tana | | | | | | | | | |
| | | JOB TYPE | DESTINATION | NUMBER | TWO-SIDED | FORMAT | ORIGINAL SIZE | TRANSMISSION SIZE | ORIENTATION | RESOLUTION | COLOR | etc. |
| | | | | | ONE-SIDED | PDF | A4 | AUTO | AUTO | 200x200dpi | AUTO | |
| THIS TIME SETTINGS | | | | 5 | ONE-SIDED | PDF | A4 | A4 | AUTO | 200x200dpi | AUTO | |
| DEFAULT SETTINGS | 004 | SIMPLE FAX | 0123456789, PLANNING DIVISION, ... | | | | | | | | | |
| | | JOB TYPE | DESTINATION | NUMBER | TWO-SIDED | | SIZE | | | | | |
| | | | | | | | A4 | | | | | |
| THIS TIME SETTINGS | | | | 2 | AUTO | A4 | ONE-SIDED | 100% | | | | |
| DEFAULT SETTINGS | 005 | COPY | | | | | | | | | | |
| | | JOB TYPE | | NUMBER OF COPIES | COLOR | SIZE | TWO-SIDED | MAGNIFICATION | TRAY | STAPLED | etc. | |
| | | | | 1 | AUTO | A4 | ONE-SIDED | 100% | AUTO | UNSTAPLED | | |
| THIS TIME SETTINGS | | | | 1 | AUTO | A4 | TWO-SIDED | 100% | AUTO | UNSTAPLED | | |
| DEFAULT SETTINGS | 006 | SIMPLE COPY | | | | | | | | | | |
| | | JOB TYPE | | NUMBER OF COPIES | COLOR | SIZE | TWO-SIDED | MAGNIFICATION | TRAY | STAPLED | etc. | |
| | | | | 1 | AUTO | A4 | ONE-SIDED | 100% | TRAY | UNSTAPLED | | |
| THIS TIME SETTINGS | | | | 1 | AUTO | A4 | TWO-SIDED | 100% | AUTO | NEEDLELESS | | |
| DEFAULT SETTINGS | 007 | SIMPLE SCAN | Yamada@sample.com, Tana | | | | | | | | | |
| | | JOB TYPE | DESTINATION | NUMBER | TWO-SIDED | FORMAT | ORIGINAL SIZE | TRANSMISSION SIZE | ORIENTATION | RESOLUTION | COLOR | etc. |
| | | | | | ONE-SIDED | PDF | A4 | AUTO | AUTO | 200x200dpi | AUTO | |
| THIS TIME SETTINGS | | | | 5 | ONE-SIDED | PDF | A4 | A4 | AUTO | 600x600dpi | GRAYSCALE | |
| DEFAULT SETTINGS | 008 | SCAN AND SAVE | STANDARD FOLDER | | | | | | | | | |
| | | JOB TYPE | DESTINATION | NUMBER | TWO-SIDED | FORMAT | ORIGINAL SIZE | TRANSMISSION SIZE | ORIENTATION | RESOLUTION | COLOR | etc. |
| | | | | | ONE-SIDED | PDF | A4 | AUTO | AUTO | 200x200dpi | AUTO | |
| THIS TIME SETTINGS | | | | 1 | AUTO | A4 | ONE-SIDED | 100% | A4 | AUTO | 200x200dpi | AUTO |
| DEFAULT SETTINGS | 009 | COPY | | | | | | | | | | |
| | | JOB TYPE | | NUMBER OF COPIES | COLOR | SIZE | TWO-SIDED | MAGNIFICATION | TRAY | STAPLED | etc. | |
| | | | | 1 | AUTO | A4 | TWO-SIDED | 100% | TRAY | STAPLED | | |
| THIS TIME SETTINGS | | | | 1 | AUTO | A4 | ONE-SIDED | 100% | AUTO | UNSTAPLED | | |
| DEFAULT SETTINGS | 010 | SIMPLE COPY | | | | | | | | | | |
| THIS TIME SETTINGS | | | | 1 | AUTO | A4 | ONE-SIDED | 100% | TRAY1 | NEEDLELESS | | |

FIG. 10

| | HISTORY ID | JOB TYPE | NUMBER OF COPIES | COLOR | SIZE | TWO-SIDED | MAGNIFICATION | TRAY | STAPLED | etc. |
|---|---|---|---|---|---|---|---|---|---|---|
| DEFAULT SETTINGS | 001 | SIMPLE COPY | 1 | AUTO | A4 | ONE-SIDED | 100% | AUTO | UNSTAPLED | |
| THIS TIME SETTINGS | | | 1 | AUTO | A4 | ONE-SIDED | 100% | TRAY 1 | NEEDLELESS | |
| | HISTORY ID | JOB TYPE | NUMBER OF COPIES | COLOR | SIZE | TWO-SIDED | MAGNIFICATION | TRAY | STAPLED | etc. |
| DEFAULT SETTINGS | 005 | COPY | 1 | AUTO | A4 | TWO-SIDED | 100% | TRAY | STAPLED | |
| THIS TIME SETTINGS | | | 1 | AUTO | A4 | TWO-SIDED | 100% | AUTO | UNSTAPLED | |

| | HISTORY ID | JOB TYPE | DESTINATION | NUMBER | TWO-SIDED | FORMAT | ORIGINAL SIZE | TRANSMISSION SIZE | ORIENTATION | RESOLUTION | COLOR |
|---|---|---|---|---|---|---|---|---|---|---|---|
| DEFAULT SETTINGS | | | | | ONE-SIDED | PDF | | | AUTO | 200x200dpi | AUTO |
| THIS TIME SETTINGS | 007 | SIMPLE SCAN | Yamada@sample.com, Tana | 5 | ONE-SIDED | PDF | A4 | A4 | AUTO | 600x600dpi | GRAYSCALE |
| | HISTORY ID | JOB TYPE | DESTINATION | NUMBER | SIZE | etc. | | | | | |
| DEFAULT SETTINGS | | | | | A4 | | | | | | |
| THIS TIME SETTINGS | 004 | SIMPLE FAX | 0123456789, PLANNING DIVISION, … | 2 | A4 | | | | | | |

| | HISTORY ID | JOB TYPE | DESTINATION | NUMBER | TWO-SIDED | FORMAT | ORIGINAL SIZE | TRANSMISSION SIZE | ORIENTATION | RESOLUTION | COLOR |
|---|---|---|---|---|---|---|---|---|---|---|---|
| DEFAULT SETTINGS | | | | | ONE-SIDED | PDF | | | AUTO | 200x200dpi | AUTO |
| THIS TIME SETTINGS | 008 | SCAN AND SAVE | STANDARD FOLDER | 1 | ONE-SIDED | PDF | A4 | A4 | AUTO | 200x200dpi | AUTO |

FIG. 12A

| | HISTORY ID | JOB TYPE | NUMBER OF COPIES | COLOR | SIZE | TWO-SIDED | MAGNIFICATION | TRAY | STAPLED | etc. |
|---|---|---|---|---|---|---|---|---|---|---|
| DEFAULT SETTINGS | | | 1 | AUTO | A4 | ONE-SIDED | 100% | AUTO | UNSTAPLED | |
| THIS TIME SETTINGS | 001 | SIMPLE COPY | 1 | AUTO | A4 | ONE-SIDED | 100% | TRAY 1 | NEEDLELESS | |

| | HISTORY ID | JOB TYPE | DESTINATION | | NUMBER | TWO-SIDED | FORMAT | ORIGINAL SIZE | TRANSMISSION SIZE | ORIENTATION | RESOLUTION | COLOR | etc. |
|---|---|---|---|---|---|---|---|---|---|---|---|---|---|
| DEFAULT SETTINGS | | | | | | ONE-SIDED | PDF | | | AUTO | 200x200dpi | AUTO | |
| THIS TIME SETTINGS | 003 | SIMPLE SCAN | Yamada@sample.com, Tana | | 5 | ONE-SIDED | PDF | A4 | A4 | AUTO | 200x200dpi | AUTO | |

FIG. 12B

| | HISTORY ID | JOB TYPE | NUMBER OF COPIES | COLOR | SIZE | TWO-SIDED | MAGNIFICATION | TRAY | STAPLED | etc. |
|---|---|---|---|---|---|---|---|---|---|---|
| DEFAULT SETTINGS | | | 1 | AUTO | A4 | ONE-SIDED | 100% | AUTO | UNSTAPLED | |
| THIS TIME SETTINGS | 011 | COPY | 1 | AUTO | A4 | TWO-SIDED | 100% | AUTO | UNSTAPLED | etc. |

| | HISTORY ID | JOB TYPE | DESTINATION | | NUMBER | SIZE | | | | | | | |
|---|---|---|---|---|---|---|---|---|---|---|---|---|---|
| DEFAULT SETTINGS | | | | | | | | | | | | | |
| THIS TIME SETTINGS | 012 | SIMPLE FAX | 0987654321, PLANNING DIVISION, ... | | 2 | A4 | | | | | | | |

| | HISTORY ID | JOB TYPE | NUMBER OF COPIES | COLOR | SIZE | TWO-SIDED | MAGNIFICATION | TRAY | STAPLED | etc. |
|---|---|---|---|---|---|---|---|---|---|---|
| DEFAULT SETTINGS | | | 1 | AUTO | A4 | ONE-SIDED | 100% | AUTO | UNSTAPLED | |
| THIS TIME SETTINGS | 013 | COPY | 1 | AUTO | A4 | ONE-SIDED | 100% | AUTO | UNSTAPLED | |

| | HISTORY ID | JOB TYPE | DESTINATION | | NUMBER | TWO-SIDED | FORMAT | ORIGINAL SIZE | TRANSMISSION SIZE | ORIENTATION | RESOLUTION | COLOR | etc. |
|---|---|---|---|---|---|---|---|---|---|---|---|---|---|
| DEFAULT SETTINGS | | | | | | ONE-SIDED | PDF | | | AUTO | 200x200dpi | AUTO | |
| THIS TIME SETTINGS | 014 | SCAN AND SAVE | STANDARD FOLDER | | 1 | ONE-SIDED | PDF | A4 | A4 | AUTO | 200x200dpi | AUTO | |

FIG. 13

| HISTORY ID | JOB TYPE | NUMBER OF COPIES | COLOR | SIZE | TWO-SIDED | MAGNIFICATION | TRAY | STAPLED | etc. |
|---|---|---|---|---|---|---|---|---|---|
| 001 | SIMPLE COPY | | | | | | | | |
| DEFAULT SETTINGS | | 1 | AUTO | A4 | ONE-SIDED | 100% | AUTO | UNSTAPLED | |
| THIS TIME SETTINGS | | 1 | AUTO | A4 | ONE-SIDED | 100% | TRAY 1 | NEEDLELESS | |

| HISTORY ID | JOB TYPE | DESTINATION | NUMBER | TWO-SIDED | FORMAT | ORIGINAL SIZE | ORIENTATION | RESOLUTION | COLOR | etc. |
|---|---|---|---|---|---|---|---|---|---|---|
| 003 | SIMPLE SCAN | Yamada@sample.com, Tana | | | | | | | | |
| DEFAULT SETTINGS | | | | ONE-SIDED | PDF | | AUTO | 200x200dpi | AUTO | |
| THIS TIME SETTINGS | | | 5 | ONE-SIDED | PDF | A4 | AUTO | 600x600dpi | GRAYSCALE | |

| HISTORY ID | JOB TYPE | NUMBER OF COPIES | COLOR | SIZE | TWO-SIDED | MAGNIFICATION | TRAY | STAPLED | etc. |
|---|---|---|---|---|---|---|---|---|---|
| 011 | COPY | | | | | | | | |
| DEFAULT SETTINGS | | 1 | AUTO | A4 | ONE-SIDED | 100% | AUTO | STAPLED | |
| THIS TIME SETTINGS | | 1 | AUTO | A4 | TWO-SIDED | 100% | AUTO | UNSTAPLED | |

| HISTORY ID | JOB TYPE | DESTINATION | NUMBER | SIZE | etc. |
|---|---|---|---|---|---|
| 012 | SIMPLE FAX | | | | |
| DEFAULT SETTINGS | | | | | |
| THIS TIME SETTINGS | | 0987654321, PLANNING DIVISION,… | 2 | A4 | etc. |

| HISTORY ID | JOB TYPE | DESTINATION | NUMBER | TWO-SIDED | FORMAT | ORIGINAL SIZE | ORIENTATION | RESOLUTION | COLOR | etc. |
|---|---|---|---|---|---|---|---|---|---|---|
| 014 | SCAN AND SAVE | STANDARD FOLDER | | | | | | | | |
| DEFAULT SETTINGS | | | | ONE-SIDED | PDF | | AUTO | 200x200dpi | AUTO | |
| THIS TIME SETTINGS | | | 1 | ONE-SIDED | PDF | A4 | AUTO | 200x200dpi | AUTO | |

FIG. 14

| SETTING HISTORY |
|---|
| 2020/02/22 20:20 SIMPLE COPY<br>TRAY:TRAY 1, TWO-SIDED: ONE-SIDED→ONE-SIDED,<br>STAPLED: NEEDLELESS STAPLE, ······ |
| 2020/02/11 20:24 SIMPLE SCAN　　　　　　　　　　 5<br>DESTINATION:Yamada@sample.com, Tanaka@sample.com,<br>TWO-SIDED: ONE-SIDED→ONE-SIDED, ······ |
| 2020/02/13 15:15 COPY　　　　　　　　　　　　　　 2<br>TRAY: AUTO, TWO-SIDED: ONE-SIDED→TWO-SIDED,<br>STAPLED: off, ······ |
| 2020/02/13 19:32 SIMPLE FAX<br>DESTINATION: 0123456789, PLANNING DIVISION ······ |
| 2020/02/13 20:11 SCAN AND SAVE<br>DESTINATION: STANDARD FOLDER, ······ |

…

IMAGE PROCESSING APPARATUS AND METHOD FOR DISPLAYING HISTORY INFORMATION

BACKGROUND OF THE INVENTION

Field of the Invention

The present disclosure relates to an image processing apparatus and the like.

Description of the Background Art

Some image processing apparatuses such as multifunction peripherals store setting values related to jobs executed in a mode such as copy mode, fax mode, and scan mode, as history information.

By associating user identification information (for example, user name, user ID, or the like) with history information that stores setting values related to job execution (hereinafter referred to as "setting history" in this disclosure), there has been attempted to facilitate recalling the setting history on a per-user basis and execution of jobs that reuse the setting history.

For example, a prior art technique discloses that, when a logged-in user authenticated by an image forming apparatus performs an operation to display the setting history, only the setting history corresponding to that logged-in user is displayed.

Since the prior art technique is configured to display the setting history corresponding only to the logged-in user who has been authenticated by the image forming apparatus, it can prevent unauthorized use by other users and leakage of personal information such as destination information to outside parties.

However, in the prior art technique, the setting history associated with a user cannot preferentially be displayed until the user is authenticated as the logged-in user. In this case, a user located in the vicinity of the relevant image forming apparatus for the purpose of operating the apparatus needs to log in to the apparatus before searching for and displaying the setting history associated with the user. This is not very convenient for the user.

It is an object of the present disclosure to provide an image processing apparatus or the like that can preferentially display the setting history associated with a recognized user in accordance with the recognition result of the user located in the vicinity of the image processing apparatus, thus improving the convenience of users who operate the image processing apparatus.

SUMMARY OF THE INVENTION

In order to solve the above problem, an image processing apparatus according to the present disclosure includes a job executer that executes a job pertaining to image processing, a storage capable of storing history information pertaining to the execution of the job associated with an executing user of the job, a display capable of displaying the history information, a recognizer that recognizes the executing user, and a controller, in which when the recognizer recognizes the executing user before the executing user is authenticated, the controller preferentially displays the history information associated with the recognized executing user.

A method for displaying history information according to the present disclosure includes executing a job pertaining to image processing, storing history information pertaining to the executing the job by associating the history information with an executing user of the job, displaying the history information, recognizing the executing user, and controlling, when the executing user is recognized in the recognizing before the executing user is authenticated, to preferentially display the history information associated with the executing user.

According to the present disclosure, the setting history associated with the recognized user is preferentially displayed in accordance with the recognition result of the user located in the vicinity of the image processing apparatus, thus improving the convenience of the user who operates the image processing apparatus.

BRIEF DESCRIPTION OF THE DRAWINGS

FIGS. 3A and 3B each illustrate an example of a data structure of history information;

FIG. 4 illustrates an example structure of a history-to-user management table;

FIG. 5 illustrates an example of a data structure of history information;

FIG. 9 is a view explaining an operation example of the first embodiment;

FIG. 10 is a view explaining an operation example of the first embodiment;

FIGS. 12A and 12B are views each explaining an operation example of the first embodiment;

FIG. 13 is a view explaining an operation example of the first embodiment;

FIG. 14 is a view explaining an operation example of the first embodiment;

DESCRIPTION OF THE PREFERRED EMBODIMENTS

Embodiments of the present disclosure will be described below with reference to the accompanying drawings. In the present disclosure, a multifunction peripheral capable of executing jobs in the mode such as copy mode, fax mode, and scan mode is described as a form of the image processing apparatus. The embodiments described below are presented as examples for explaining the present disclosure, and therefore the technical scope thereof as recited in the appended claims is not limited by the following description.

1 First Embodiment

A first embodiment is a form that preferentially displays setting history associated with a recognized user in accordance with the recognition result of the recognized user located in the vicinity of a multifunction peripheral used as an image processing apparatus.

1.1 Functional Structure

Figure 1:
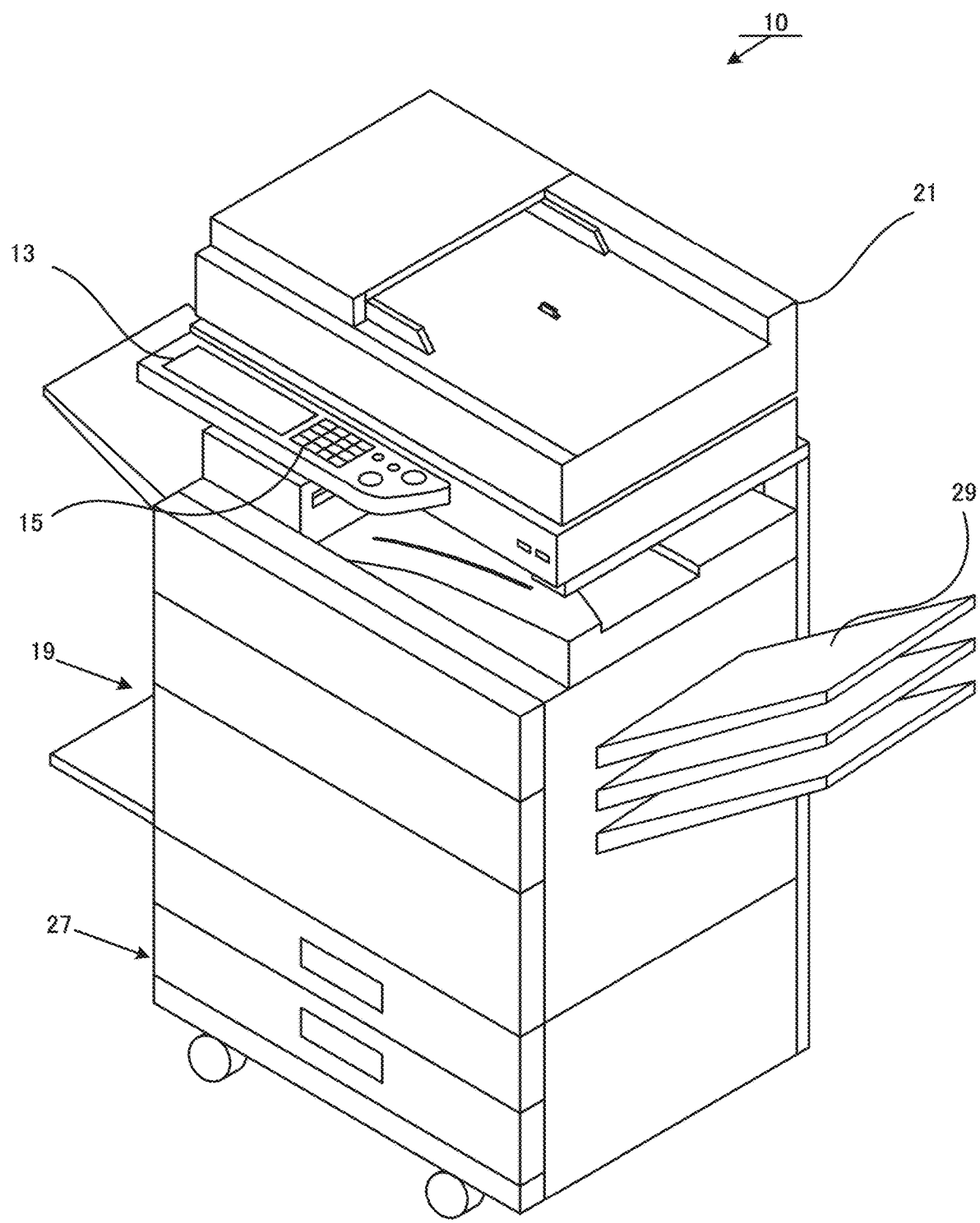
FIG. 1 is a perspective view illustrating the exterior of a multifunction peripheral according to a first embodiment.
Figure 2:
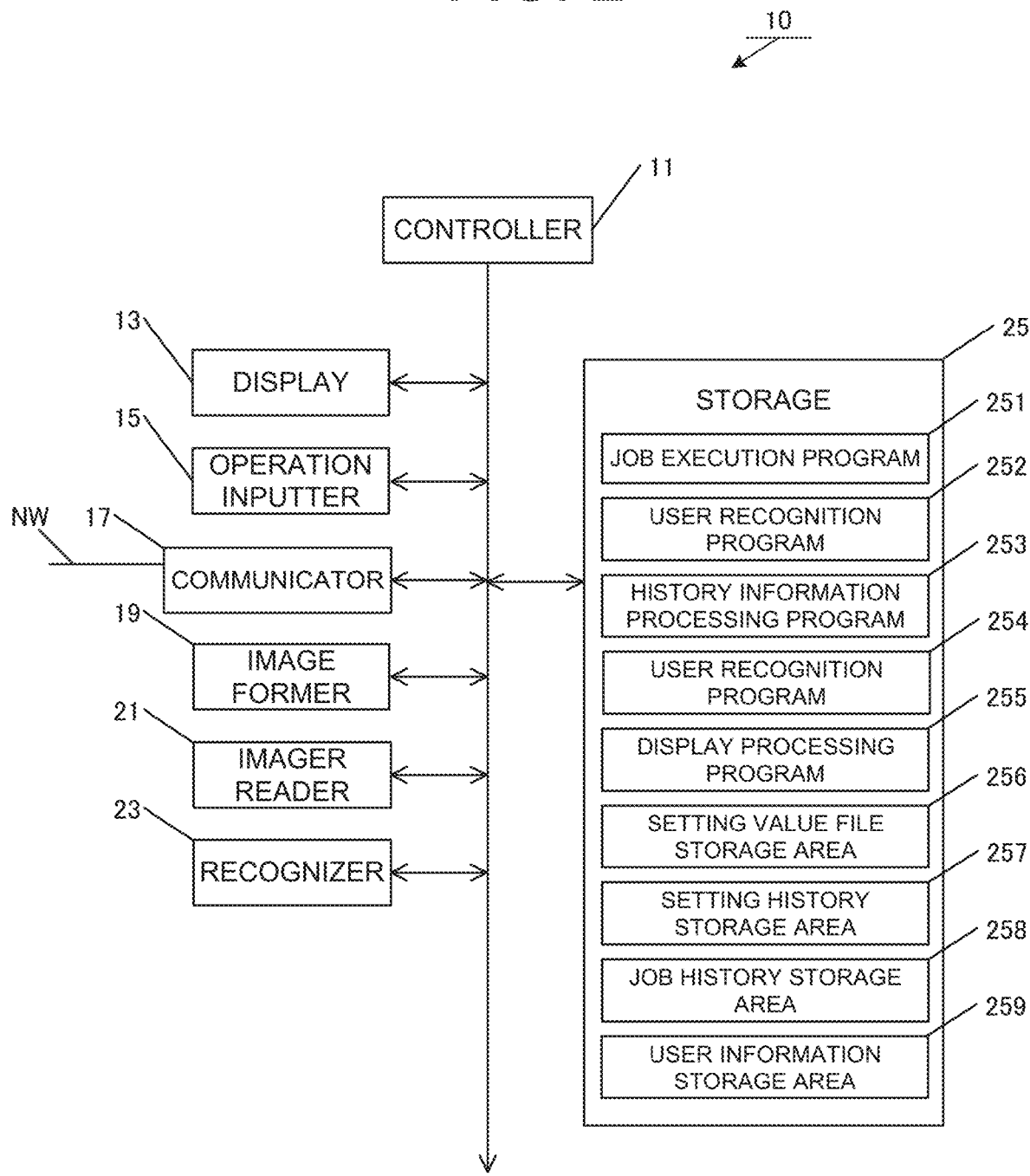
FIG. 2 illustrates a functional structure of the multifunction peripheral according to the first embodiment.

FIG. 1 is a perspective view of the exterior of a multifunction peripheral 10 for explaining an overall structure thereof according to the first embodiment. FIG. 2 illustrates a functional structure of the multifunction peripheral 10. The multifunction peripheral 10 includes a controller 11, a display 13, an operation inputter 15, a communicator 17, an image former 19, an image reader 21, a recognizer 23, and a storage 25.

The controller 11 controls the entire multifunction peripheral 10. The controller 11 includes one or more computing devices (for example, a central processing unit: CPU or the like). The controller 11 implements its functions by invoking and executing various programs stored in the storage 25.

The display 13 displays various kinds of information to the user or the like. The display 13 may be provided as a liquid crystal display (LCD), an organic electro-luminescence (EL) display, or the like.

The operation inputter 15 accepts input of information by the user or the like. The operation inputter 15 may be provided as hard keys (for example, a numeric keypad), buttons, or the like. The operation inputter 15 can also be provided as a touch panel that allows input via the display 13. In that case, the touch panel can employ, for example, a resistive, electromagnetic induction, or capacitive input method.

The communicator 17 includes either a wired or wireless interface or both interfaces to communicate with other devices via a network (NW) such as a local area network (LAN), a wide area network (WAN), the Internet, telephone lines, fax lines, or the like.

The image former 19 forms images based on the image data on paper as a recording medium. The image former 19 feeds paper from a paper feeder 27, forms an image based on the image data on the paper, and then discharges the paper to a paper discharger 29. The image former 19 can include, for example, a laser printer using electrophotography. The image former 19 forms images using toners supplied from toner cartridges, which are not illustrated, each toner corresponding to a toner color (for example, cyan, magenta, yellow, or black).

The image reader 21 scans and reads the image of an original to be read and generates the image data. The image reader 21 can be provided as a scanner including an image sensor such as a charge coupled device (CCD) or a contact image sensor (CIS). The structure of the image reader 21 is not limited, but the image reader 21 needs to generate image data by reading a reflected light image from the original image using the image sensor.

The structure of the recognizer 23 is not limited, but the recognizer 23 needs to acquire and output image information, voice information, or the like concerning a person (user) located in the vicinity of the multifunction peripheral 10 as the recognition information. The recognizer 23 can employ an image capturing (filming) and recording device such as, for example, a camera installed in the multifunction peripheral 10 or a camera for indoor monitoring, which can acquire and output image information pertaining to recognition of persons, such as face, gaze, movement of the corners of the mouth, body shape (skeleton), posture, movement, behavior, gait, and distance to the multifunction peripheral 10. The recognizer 23 may be, for example, a sound collecting and recording device that records the voice uttering from persons. It is also possible to employ a wireless communication function provided by a terminal device such as smartphone (for example, Bluetooth (registered trademark), Wi-Fi (registered trademark), near field communication (NFC)), or a location information transmission and acquisition function (for example, global positioning system (GPS), beacons, or the like), and use individual identification information, location information, and the like of the terminal device obtained by these functions as recognition information of the person possessing such a terminal device.

The storage 25 stores various programs and data necessary for the operation of the multifunction peripheral 10. The storage 25 can include a storage such as a random access memory (RAM), a hard disk drive (HDD), a solid state drive (SSD), a read only memory (ROM), or the like.

In the first embodiment, the storage 25 stores a job execution program 251, a user recognition program 252, a history information processing program 253, a user authentication program 254, and a display processing program 255, and reserves a setting value file storage area 256, a setting history storage area 257, a job history storage area 258, and a user information storage area 259.

The job execution program 251 is a program read by the controller 11 to execute jobs in a mode such as copy mode, fax mode, or scan mode. The controller 11 that has read the job execution program 251 executes the job by controlling a job executer involved in the execution of the job in the mode in the display 13, the operation inputter 15, the communicator 17, the image former 19, the image reader 21, and the like. The controller 11 that has invoked the job execution program 251 can execute various types of jobs in accordance with the setting values included in the setting value file associated with the setting history which is history information.

The user recognition program 252 is a program that the controller 11 reads when recognizing an executing user located in the vicinity of the multifunction peripheral 10 as an operating user. As used herein, the executing user according to the present disclosure represents the user who has operated the multifunction peripheral 10 in the past and has executed jobs in the mode such as copy mode, fax mode, or scan mode. A setting history that is generated as the job is executed is associated with the user identification information of the executing user. In addition, the operating user according to the present disclosure represents the executing user who operates or may operate the multifunction peripheral 10. The controller 11 that has read the user recognition program 252 recognizes the executing user located in the vicinity of the multifunction peripheral 10 as the operating user by using, for example, the image information or voice information acquired by controlling the recognizer 23, or individual identification information of the terminal device possessed by the user. For example, the controller 11 can recognize the operating user by using the image information acquired via the recognizer 23 as input values, and comparing the entered image information after converting it to feature quantity. The controller 11 can also recognize a person who is uttering a specific keyword (for example, print, copy, or the like) as the operating user from the analysis result that is based on the voice acquired by the sound collecting and recording device or the like. Unlike the biometric recognition described above, when performing the user recognition using the individual identification information and the location information of the terminal device, the controller 11 also controls the communicator 17 or the like to communicate as necessary to obtain the individual information or the like of the terminal device. The controller 11 can also recognize the operating user by using machine learning that uses, as input values, accumulated recognition information as described above, user operation information associated with recognition results, date and time information, schedule information of the executing (operating) user, and the like.

The history information processing program 253 is a program that the controller 11 reads when acquiring the setting values pertaining to the execution of the job, generating the setting history, or generating various types of processing or job history of the setting history. The controller 11 that has invoked the history information processing program 253 acquires the setting values pertaining to the execution of the job and generates a setting value file accommodating the setting values. The controller 11 then stores the generated setting value file in the setting value file storage area 256 in association with the setting history. The controller 11 also manages the setting history by associating it with the user name or user ID of the executing user who has executed the job corresponding to the setting history.

The controller 11 that has read the history information processing program 253 performs, in accordance with the user recognition results, selection processing of display candidates of the setting history to be displayed on a setting history display screen which will be described later. The selection processing of the display candidates will be described later.

The user authentication program 254 is a program that the controller 11 reads when authenticating the executing user and other users who log in to the multifunction peripheral 10. The controller 11 that has read the user authentication program 254 displays a login screen, which will be described later, when the user authentication function is on. For example, the controller 11 stores the login user name associated with the login password in advance, and authenticates the user login by matching the login user name and login password entered via the login screen. In addition to knowledge authentication based on the input of the login user name and login password, the login authentication can also be performed by means of possession authentication using a token, a key, an IC card, a smartphone, or the like, or biometric authentication using, for example, fingerprint, palm print, or blood vessel.

The display processing program 255 is a program that the controller 11 reads when controlling the display screen displayed via the display 13. The controller 11 that has read the display processing program 255 displays, on the display 13, a setting history display screen that displays setting histories, a setting screen that accepts input of various setting values pertaining to job execution, or a home screen that accepts, for example, instructions to switch respective (operation) modes. The controller 11 that has read the display processing program 255 also displays, on the setting history display screen, the setting history selected in accordance with the selection results of the display candidates o the setting history.

The setting value file storage area 256 is a storage area for storing the setting value files generated by the controller 11 that has read the history information processing program 253. Setting values include, for example, color mode, size, two-sided copy, (copy) ratio, tray, staple, and other settings set by the user, as well as the device default values retained in the multifunction peripheral 10 itself from the factory. The controller 11 that has invoked the job execution program 251 can retrieve the setting value file associated with the setting history to be executed from the setting value file storage area 256, and can execute the job in accordance with the setting values included in the setting value file.

The setting history storage area 257 is a storage area for storing the setting histories generated by the controller 11 that has read the history information processing program 253. The setting histories stored in the setting history storage area 257 is called up as necessary during the selection processing of the display candidates for the setting history and during the display processing on the setting history display screen.

The job history storage area 258 is a storage area that stores job execution records as the job histories. The job history is generated by the controller 11 that has read the history information processing program 253. Unlike the setting history, the job history is information that records the execution history of the job, so that it can be generated at any time, for example, before or after the execution of the job or before or after the generation of the setting history.

The user information storage area 259 is a storage area for storing information, such as the login user name and the login password, pertaining to the user authentication of the executing user and other users who attempt to log in to the multifunction peripheral 10. The user information storage area 259 also stores the history-to-user management table to manage the setting histories in relation to the executing user. Furthermore, the user information storage area 259 can store various types of information (for example, feature quantity for user recognition) used to recognize the executing user located in the vicinity of the multifunction peripheral 10 as the operating user.

The setting history and the setting value file according to the present disclosure are described. FIG. 3A illustrates an example of a data structure of the setting history stored in the setting history storage area 257. FIG. 3B illustrates an example data structure of the setting value file stored in the setting value file storage area 256.

The setting history illustrated in FIG. 3A includes a history ID, execution date and time, job type, displayed setting values, and a setting value file name.

The history ID is an identifier to uniquely identify the setting value history. The history ID is assigned to each setting history generated. As illustrated in FIG. 3A, the history ID may be a serial number, or may include a predetermined string of characters, symbols, or the like. The execution date and time represents the date and time when the job is executed and the setting history is generated. The job type indicates the type of the executed job (for example, simple copy job, simple scan job, or the like). The displayed setting values represent some of the setting values (contents) that are displayed on the setting history display screen when the setting history is displayed. The setting value file name represents the file name of the setting value file associated with the relevant setting history.

For example, the setting history of the history ID "001" represents the setting history pertaining to the job type "simple copy" executed on "2020/02/2220:20." Furthermore, the job is the simple copy job executed in accordance with the setting values included in the setting value file "001.config" in which, as the displayed setting values, the setting values including "number of copy: 1, color mode: auto, size: A4, two-sided (copy): one-sided, ratio: 100 x, tray: tray 1, stapled: no needle" and the like are set. The displayed setting values that are set according to each setting history are merely examples, and the setting values displayed on the setting history display screen are not limited to the items illustrated in FIG. 3A.

FIG. 3B illustrates an example of the data structure of the setting value file "001. config" associated with the setting history of the history ID "001" of FIG. 3A. The setting value file can be formed as a text file that accommodates the setting values corresponding to each setting content. If there is no need for readability by the user or the like, the setting value file can be formed of binary data.

For example, FIG. 3B illustrates an example of the setting value file pertaining to the simple copy job, accommodating the setting values to execute the simple copy job (for example, number of copies: 1, color mode: auto, size: A4, two-sided copy: one-sided, ratio: 100%, tray: tray 1, staple/punch: no needle, copy density: auto, . . . ).

Next, the history-to-user management table managed by the controller 11 is described. FIG. 4 is a table explaining an example of the data structure of the history-to-user management table stored in the user information storage area 259. The history-to-user management table illustrated in FIG. 4 includes the history ID, the user name, and the user ID.

The history ID is the same as the history ID described in FIG. 3A. The history-to-user management table stores the history ID by associating it with the user name and/or user ID of the executing user. The user name is the user name of the executing user who has executed the job pertaining to the setting history indicated by the history ID. The user ID is an identifier to identify the executing user. The history ID can be associated with either or both the user name and the user ID.

For example, the history ID "001" illustrated in FIG. 4 is associated with the executing user having the user name "aaaaa" and user ID "0001@sample." For the sake of explanation, the same executing user (user name "aaaaa" and the user ID "0001@sample") is assigned to all example history IDs ("001" to "010") in FIG. 4, but a specific executing user who executes the job corresponding to the setting history should be assigned to the setting history indicated by each history ID.

FIG. 5 illustrates an example of a data structure of the job history stored in the job history storage area 258. The job history illustrated in FIG. 5 includes the job ID, the execution date and time, the job type, the user name, and the status.

The job ID is an identifier to uniquely identify the job that has been executed. The job ID is generated each time the job is executed. The job ID may be a serial number, as illustrated in FIG. 5, or may include a predetermined string of characters, symbols, or the like. The execution date and time indicates the date and time of the execution of the job. The job type indicates the type of the executed job (for example, simple copy job, simple scan job, or the like). The user name represents the name of the executing user who has executed the job. The status indicates the processing status of the job.

For example, the job history pertaining to the job ID "001" represents the job history of the job type "simple copy" executed on "2020/02/22 20:20." The job has been executed by the executing user having the user name "aaaaa," and the status of the job is "completed."

Unlike the setting history, the job history is information that records the execution history of the job, and the timing of its generation is not limited. For example, the job history can be generated at any time, such as before or after the execution of the job or before or after the generation of the setting history.

1.2 Process Flow

Figure 6:
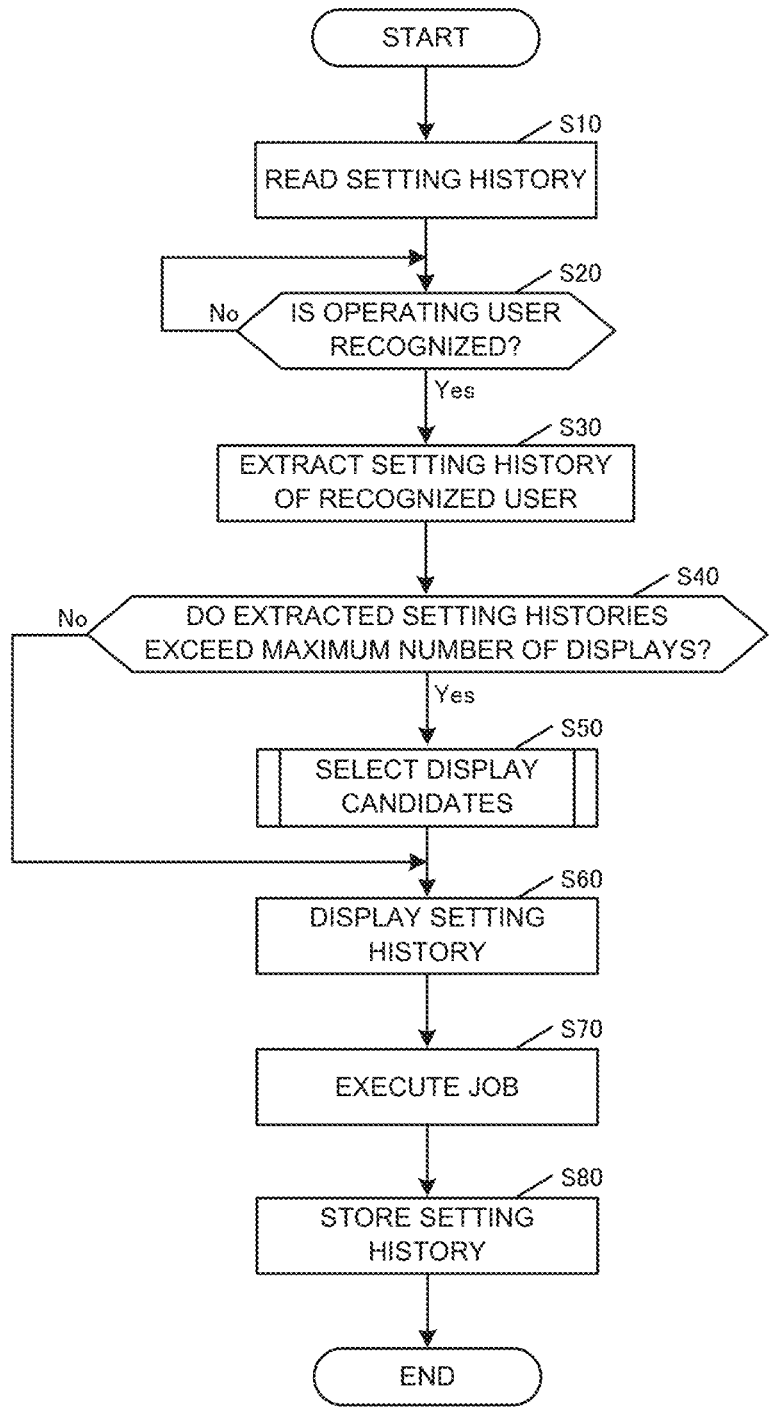
FIG. 6 is a flowchart explaining a process flow of a first embodiment.

Next, a process flow of the first embodiment will be described. FIG. 6 is a flowchart explaining the overall process performed by the multifunction peripheral 10. The process described here is executed by the controller 11 by reading the job execution program 251, the user recognition program 252, the history information processing program 253, the user authentication program 254, the display processing program 255 and the like.

For example, when the power is turned on or when the system is restored from sleep mode, the controller 11 reads the setting history together with the startup processing (step S10).

Subsequently, the controller 11 reads the user recognition program 252. The controller 11 controls the recognizer 23 to determine whether the executing user located in the vicinity of the multifunction peripheral 10 is recognized as the operating user (step S20).

When the operating user located in the vicinity of the multifunction peripheral 10 is recognized, the controller 11 reads the history information processing program 253 to extract the setting history pertaining to the job executed by the operating user (step S20; Yes→step S30).

On the other hand, if the controller 11 does not recognize the operating user located in the vicinity of the multifunction peripheral 10, the controller 11 displays a login authentication screen when the user authentication function is on. When the user authentication function is off, the controller 11 displays the initial screen (for example, the home screen) and waits until the operating user is recognized (step S20; No).

After extracting the setting history of the recognized operating user in step S30, the controller 11 determines whether the number of extracted setting histories exceeds a maximum number of settings that can be displayed on the setting history display screen (step S40).

If the number of extracted setting histories exceeds the maximum number of settings that can be displayed on the setting history display screen, the controller 11 performs selection processing of display candidate of the setting histories to be displayed on the setting history display screen in accordance with a usage trend (frequency of use) of the recognized operating user (step S40; Yes→step S50). As used herein, the usage trend (frequency of use) is a concept that covers the setting history of the job type that is (re)used by the executing user in executing the job, and the usage trend, frequency, number of times of use, and the like of the setting items (setting values) included in the setting history.

After the selection processing of the display candidates, the controller 11 displays the selected display candidates of the setting histories on the setting history display screen (step S60).

If the number of extracted setting histories is less than the maximum number of display that can be displayed on the setting history display screen, the controller 11 displays the extracted setting histories on the setting history display screen (step S40; No→step S60).

When the user selects the setting history displayed on the setting history display screen and executes the job in accordance with the setting history, the controller 11 generates a setting history according to the executed job. The controller 11 then stores the generated setting history in the setting history storage area 257 and ends the process (step S70→step S80).

In a case in which the number of setting histories stored in the setting history storage area 257 reaches the upper limit, it is possible, for example, to delete some setting histories with old execution dates or those that are considered infrequently used, and store newly generated setting histories.

Next, in step S50 of FIG. 6, the process of a case in which the number of extracted setting histories exceeds the maximum number of settings that can be displayed on the setting history display screen is described.

The present disclosure (first embodiment) describes, as the display candidate selection processing, a form in which the display candidates are determined in accordance with the usage trend (frequency of use) of the recognized operating user. The display candidates based on the usage trend of the operating user can be determined in accordance with the result of machine learning using the setting values of the setting history as input values. In this case, it is also possible to consider information such as the date and time of job execution by the operating (executing) user, the schedule information of the operating (executing) user, or the like.

Figure 7:
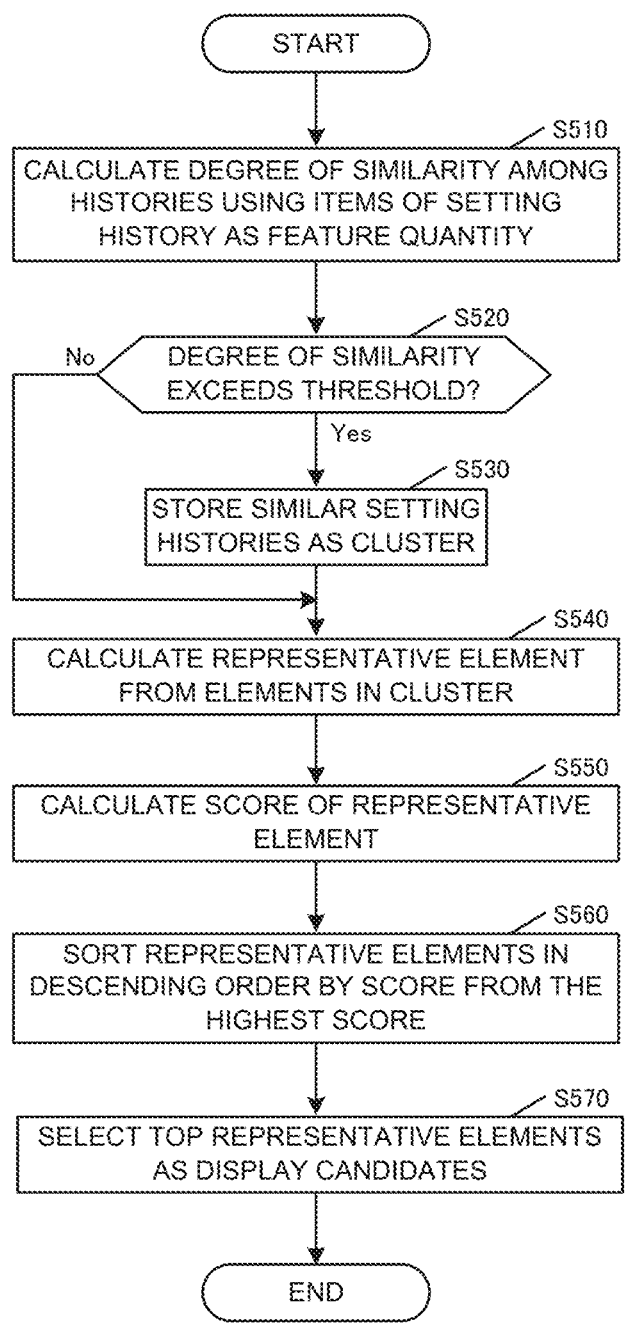
FIG. 7 is a flowchart explaining a process flow the first embodiment.

FIG. 7 is a flowchart explaining a determination process of the display candidates using the machine learning.

First, the controller 11 calculates a degree of similarity among the setting histories using the setting items of the setting histories as feature quantity (step S510).

The controller 11 classifies the setting items included in the setting history (setting value file) into the setting items that are difficult to change and the setting items that are easy to change, and calculates the degree of similarity by calculating scores of the items from the items listed below (the higher the item, the greater the weighting).

Difference in setting items that are difficult to change
Match>Different in one item>Different in two items> . . . >Unmatched Difference in setting items that are easy to change
Match>Different in one item>Different in two items> . . . >Unmatched Date and time of execution is not considered.
Weight is set for each setting item Here, the setting items that are difficult to change refer to the setting items that are not directly displayed on the setting screen for executing the job in each mode (for example, copy mode), and can be changed only after the screen change happens by manipulating tabs or buttons for detailed settings (or similar wording) (for example, skip blank page, sort, or the like).

On the other hand, the setting items that are easy to change refer to the setting items that are directly displayed on the setting screen for executing the job in each mode (for example, number of copies, color mode, or the like). The setting items directly displayed on the setting screen also include the destination in the fax mode, scan mode, or the like, but since it takes time to change the destination, it is exceptionally treated as the setting item that is difficult to change.

Subsequently, the controller 11 determines whether the degree of similarity calculated in step S510 exceeds a predetermined threshold (step S520).

If it is determined that the degree of similarity exceeds the predetermined threshold, the controller 11 stores similar setting histories as a cluster (step S520; Yes→step S530).

Subsequently, the controller 11 calculates a representative element from the elements of the cluster (step S540). The controller 11 calculates the representative element by calculating scores from the items listed below (the higher the item, the greater the weighting).

Matching setting histories
More>Less
Difference from default settings
More>Less

The controller 11 then calculates the score of the representative element (step S550). The controller 11 calculates the score of the representative element by calculating scores of the items listed below (the higher the item, the greater the weighting).

Number of elements in the cluster (=number of similar histories)
More>Less
Degree of similarity of document style (in performing optical character recognition (OCR))
High>Low
Destination (in entering the destination)
Match>Unmatched
Date and time of execution of element
New>Old
Job type (Amount of influence is set to be small.)
Image transmission job>Copy job The controller 11 sorts the representative elements in descending order by calculated score from the highest score (step S560). The controller 11 then selects the top representative elements as the display candidates in accordance with the sorting result (step S570).

If the number of setting histories extracted in step S40 of FIG. 6 is less than the maximum number that can be displayed on the setting history display screen, the setting histories corresponding to the users other than the recognized operating (executing) user can also be displayed. The selection of the setting histories corresponding to other users to be displayed can be performed according to the determination processing of the display candidates using the machine learning described above. It is also possible that, for example, the setting histories associated with other users can be extracted according to predetermined criteria (for example, the setting histories that follow the usage trend of the recognized operating user, the setting histories that do not follow the usage trend of the recognized operating user, or the setting histories that are simply executed most recently), and can be displayed together with the setting histories of the recognized operating user.

1.3 Operation Example

Figure 8:
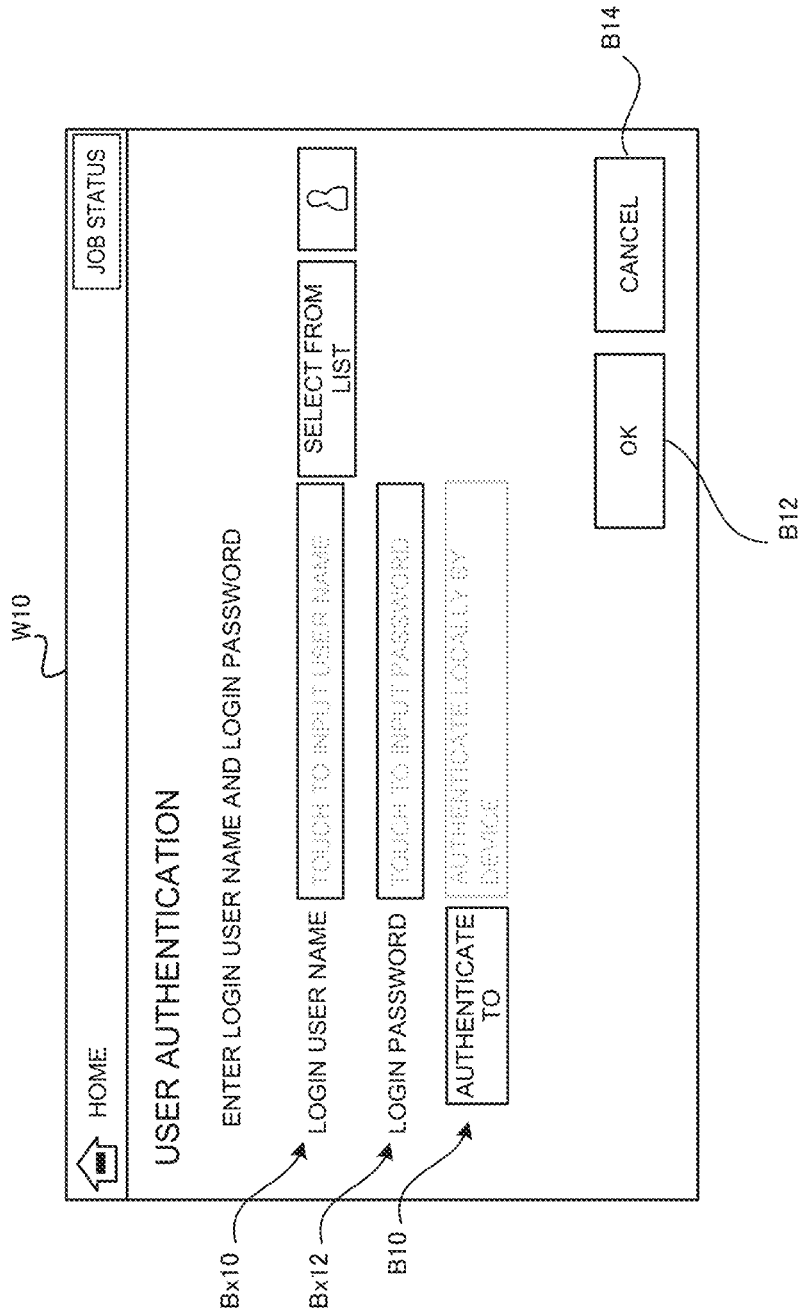
FIG. 8 is a view explaining an operation example of the first embodiment.

Next, an operation example according to the first embodiment is described. FIG. 8 is a view explaining the structure of a user authentication screen W10 displayed on the display 13 by the controller 11. The user authentication screen W10 can be formed as a login screen displayed on the display 13 by the controller 11 that has read the user authentication program 254 when the login authentication function is on. In the first embodiment, the user authentication screen W10 is displayed and, when the recognizer 23 recognizes the operating user before the executing user or other users request authentication, the setting history corresponding to the recognized operating user can be preferentially displayed. When the user authentication function is off, the controller 11 displays the home screen, which is not illustrated, on the display 13 and, when the recognizer 23 recognizes the operating user, the setting history corresponding to the recognized operating user is preferentially displayed.

The user authentication screen W10 includes a login user name input box Bx10, a login password input box Bx12, an authentication destination designation button B10, an OK button B12, and a cancel button B14.

The login user name input box Bx10 is an input box which accepts input of a login user name. The executing user or a user who attempts to log in to the multifunction peripheral 10 enters the login user name in the login user name input box Bx10. The login user name can be selected from a separately established list of user names.

The login password input box Bx12 is an input box that accepts the input of the login password corresponding to the login user name. The executing user or a user who attempts to log in to the multifunction peripheral 10 enters the login password along with the login user name.

The authentication destination designation button B10 is a button for accepting a destination where the user is to be authenticated. The user authentication may be performed locally by the device, or an authentication server or the like, for example, which is separately provided on the network (NW) may be designated. When it is designated that the authentication is made locally by the device, the controller 11 authenticates the user by comparing the entered login user name and login password with the authentication information prepared in advance (for example, a combination of the user name and the password). On the other hand, when using an authentication server or the like provided on the network (NW), the controller 11 can also authenticate the user by transmitting the entered login user name and login password to the authentication server and receiving the authentication result from the authentication server.

The OK button B12 is an input button that accepts an input of confirmation of instruction by the user. The user presses the OK button B12 when the user confirms the input to the login user name input box Bx10 or the login password input box Bx12, or the designation of the destination where the user is to be authenticated via the authentication destination designation button B10. The cancel button B14 is an input button that accepts an input to cancellation instruction of the input operation by the user.

Next, an operation example of the determination processing of the display candidates using the machine learning is described. For ease of explanation, it is assumed here that five setting histories can be displayed as the maximum number of setting histories that can be displayed on the setting history display screen. It is also assumed that the user name of the executing user who is recognized as the operating user in step S20 of FIG. 6 is "aaaaa" with whom ten setting histories of the history IDs "001" to "010" as illustrated in FIG. 3 are associated (see the history-to-user management table in FIG. 4). The number of setting histories (10) to be associated with the executing user is only an example, and the number of such setting histories is not limited to the description here.

FIG. 9 corresponds to the setting histories of the user name "aaaaa" extracted by the controller 11 in step S30 of FIG. 6, and is an example structure of the history table that summarizes the setting items (setting values) used in the machine learning for each setting history. The setting items illustrated in the history table in FIG. 9 are each used as an input value for the machine learning.

The history table illustrated in FIG. 9 are the setting items that are easy to change (the setting values that are difficult to change are omitted) and the default setting items.

For example, the setting history pertaining to the history ID "001" includes, as this time settings, (job type: simple copy, number of copies: 1, color: auto, size: A4, two-sided (copy): one-sided, ratio: 100%, tray: tray 1, staple: no, . . . ).

On the other hand, the default settings for the job type: simple copy are (number of copies: 1, color: auto, size: A4, two-sided (copy): one-sided, ratio: 100%, tray: auto, staple: no, . . . ). Therefore, in the history ID "001", the setting items concerning the tray and staple have been changed from the default settings.

The controller 11 performs the determination processing of the display candidates using the history table illustrated in FIG. 9 as input values, and calculates the scores of representative elements as described in the flowchart in FIG. 7. An operation example pertaining to the calculation of the scores of the representative elements using the setting histories illustrated in FIG. 9 is described.

In step S510 of FIG. 7, the degree of similarity of the setting histories of the example of FIG. 9 is calculated as:

Exactly matched setting histories: (history ID: 001, 010) and (history ID: 005, 009)

Different in one item: (history ID: 001, 006, 010) and (history ID: 002, 005, 009)

Different in two items: (history ID: 003, 007)

According to the calculation results of the degree of similarity, the setting histories of the example of FIG. 9 are classified as clusters (history ID: 001, 006, 010), (history ID: 002, 005, 009), (history ID: 003, 007), (history ID: 4), and (history ID: 8).

In step S540 of FIG. 7, the controller 11 calculates the representative elements from the classified clusters.

Cluster (history ID: 001, 006, 010)
Matching setting histories: (history ID: 001, 010)
Difference from default settings: (history ID: 001, 010)= (history ID: 006)
Therefore, the controller 11 calculates the representative elements as (history ID: 001, 010).

Cluster (history ID: 002, 005, 009)
Matching setting histories: (history ID: 005, 009)
Difference from default settings: (history ID: 005, 009)> (history ID: 002)
Therefore, the controller 11 calculates the representative element as (history ID: 005, 009).

Cluster (history ID: 003, 007)
Matching setting history: None
Difference from default settings: (history ID: 007)
Therefore, the controller 11 calculates the representative element as (history ID: 007).

In step S550, the controller 11 calculates the scores of the representative elements.

Representative elements (history ID: 001, 010)
Number of elements of the duster: 3
Latest execution date and time: (history ID: 001)
Type: Copy job
Representative elements (history ID: 005, 009)
Number of elements of the duster: 3
Latest execution date and time: (history ID: 005)
Type: Copy job
Representative element (history ID: 007)
Number of duster elements: 2
Latest execution date and time: (history ID: 007)
Type: Image transmission job
Sorting the representative elements in descending order by score from the highest score:

(history ID: 001, 010)>(history (ID: 005, 009)>(history ID: 007). In addition, (history ID: 004) and (history ID: 008) are displayed in chronological order from the latest execution date and time.

FIG. 10 is an example of the structure of a display table that defines the display order of the setting histories determined as display candidates. The setting history with the latest execution date and time is displayed preferentially.

As shown in FIG. 10, according to the determination processing of the display candidates, the controller 11 displays, as the setting histories of the executing user "aaaaa", history ID: "001">history ID "005">history ID "007" >history ID "004">history ID "008" in this order.

Figure 11:
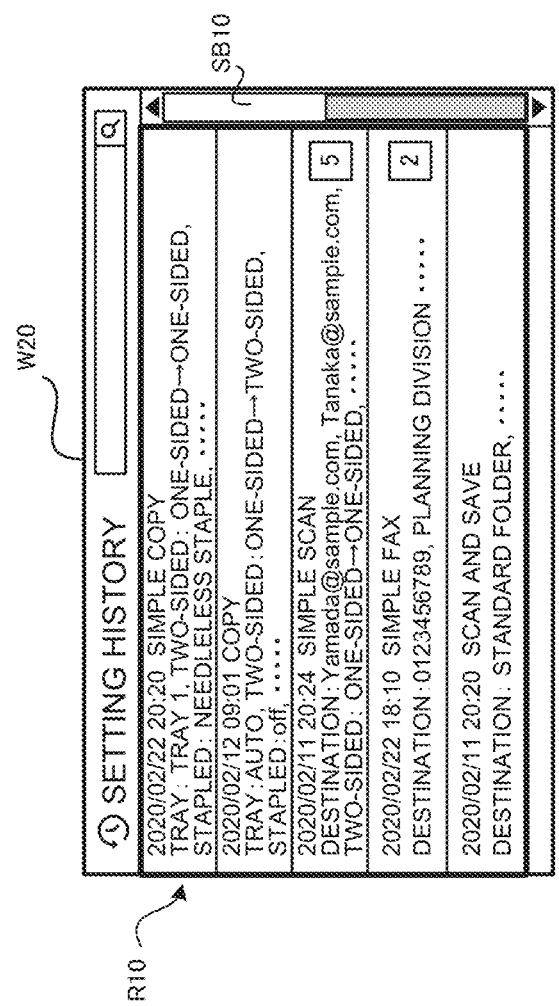
FIG. 11 is a view explaining an operation example of the first embodiment.

FIG. 11 is an example of the display structure of a setting history display screen W20 that displays the setting histories shown in the display table in FIG. 10. The setting history display screen W20 can be displayed in response to the pressing of the display instruction button, for example, on the home screen not illustrated, the setting screen corresponding to the job type, or the like.

The setting history display screen W20 includes a setting history display area R10 and a slider bar SB10. The setting history display area R10 is a display area for displaying in a selectable manner the setting histories shown in the display table in FIG. 10.

FIG. 11 is a display example illustrating, as the setting histories of the executing user "aaaaa" who is the operating user, history ID: "001">history ID "005">history ID "007">history ID "004">history ID "008" in this order in the setting history display area R10. In the setting history display area R10, the setting histories are displayed in accordance with the usage trend (frequency of use) of the recognized operating user, so that the operating user can know the usage trend of his or her own setting histories and efficiently reproduce jobs according to their setting histories.

The slider bar SB10 is formed to slide up and down. The slider bar SB10 accepts an instruction to display the area which is not displayed in the setting history display area R10. For example, by moving the slider bar SB10 up and down, pressing the arrow buttons, or flicking within the setting history display area R10, the display area which is not illustrated can be displayed in the setting history display area R10.

In the above description of the operation example according to the first embodiment, five setting histories can be displayed as the maximum number of setting histories that can be displayed on the setting history display screen W20, but with the operable slider bar SB10, it is possible to display five or more setting histories on the setting history display screen W20.

Next, an operation example in which the number of setting histories extracted is less than the maximum number of the setting histories that can be displayed on the setting history display screen in step S40 of FIG. 6 is described. In this case, the controller 11 displays the setting histories associated with other users as well as the setting histories of the executing user recognized as the operating user.

FIG. 12A is an example structure of the history table of the executing user "aaaaa" who is recognized as the operating user, and two setting histories of history IDs "001" and "003" illustrated in FIG. 3 are associated with this executing user in step S20 of FIG. 6. FIG. 12B is an example structure of the history table of the setting histories associated with a user other than the executing user.

The controller 11 adds the setting histories of other users so that (maximum number of display)=(number of setting histories of the executing user)+(number of setting histories of a different user). The selection of the setting histories corresponding to other users to be displayed can be performed according to the determination processing of the display candidates using the machine learning described above. Furthermore, it is also possible, for example, to extract the number of setting histories associated with the different user that satisfy the maximum number of display, according to predetermined criteria (for example, the setting history that is in line with the usage trend of the recognized user, the setting history that is not in line with the usage trend of the recognized user, or the setting history that is simply the latest job execution, or the like), and display them together with the recognized user.

FIG. 13 is an example of a display table that defines the display order of the setting histories (setting histories of the executing user and those of the different user) determined as the display candidates.

In FIG. 13, in addition to the setting histories, history IDs "001", "003", which are the setting histories associated with the executing user recognized as the operating user, the setting histories of history IDs "011", "012" and "014" which are setting histories associated with the different user are added. Even when the maximum number of display cannot be satisfied by adding the setting histories associated with the different user, the display table is displayed without change.

FIG. 14 is an example of the display structure of a setting history display screen W30 that displays the setting histories shown in the display table in FIG. 13.

FIG. 14 illustrates the setting histories: history IDs "001" and "003" associated with the executing user "aaaaa" as the operating user, followed by the setting histories of the different user: history IDs "011", "012", "014" in this order on the setting history display area R10. Thus, when the number of extracted setting histories is less than the maximum number that can be displayed on the setting history display screen, the setting histories associated with the different user can be added to satisfy the maximum number of display, thus allowing effectively utilizing the display area of the setting history display screen W30.

As described above, according to the first embodiment, the setting histories associated with the recognized executing user recognized as the operating user can be preferentially displayed in accordance with the recognition result of the user located in the vicinity of the multifunction peripheral, thus improving the convenience of the user operating the multifunction peripheral.

2 Second Embodiment

A second embodiment is a form in which a plurality of executing users is located in the vicinity of the multifunction peripheral 10.

2.1 Functional Structure

The functional structure of the multifunction peripheral according to the second embodiment can be substantially identical to that of the multifunction peripheral 10 of the first embodiment. Therefore, the multifunction peripheral according to the second embodiment is denoted as the multifunction peripheral 10, and the detailed description of the functional structure will be omitted.

2.2. Process Flow

Figure 15:
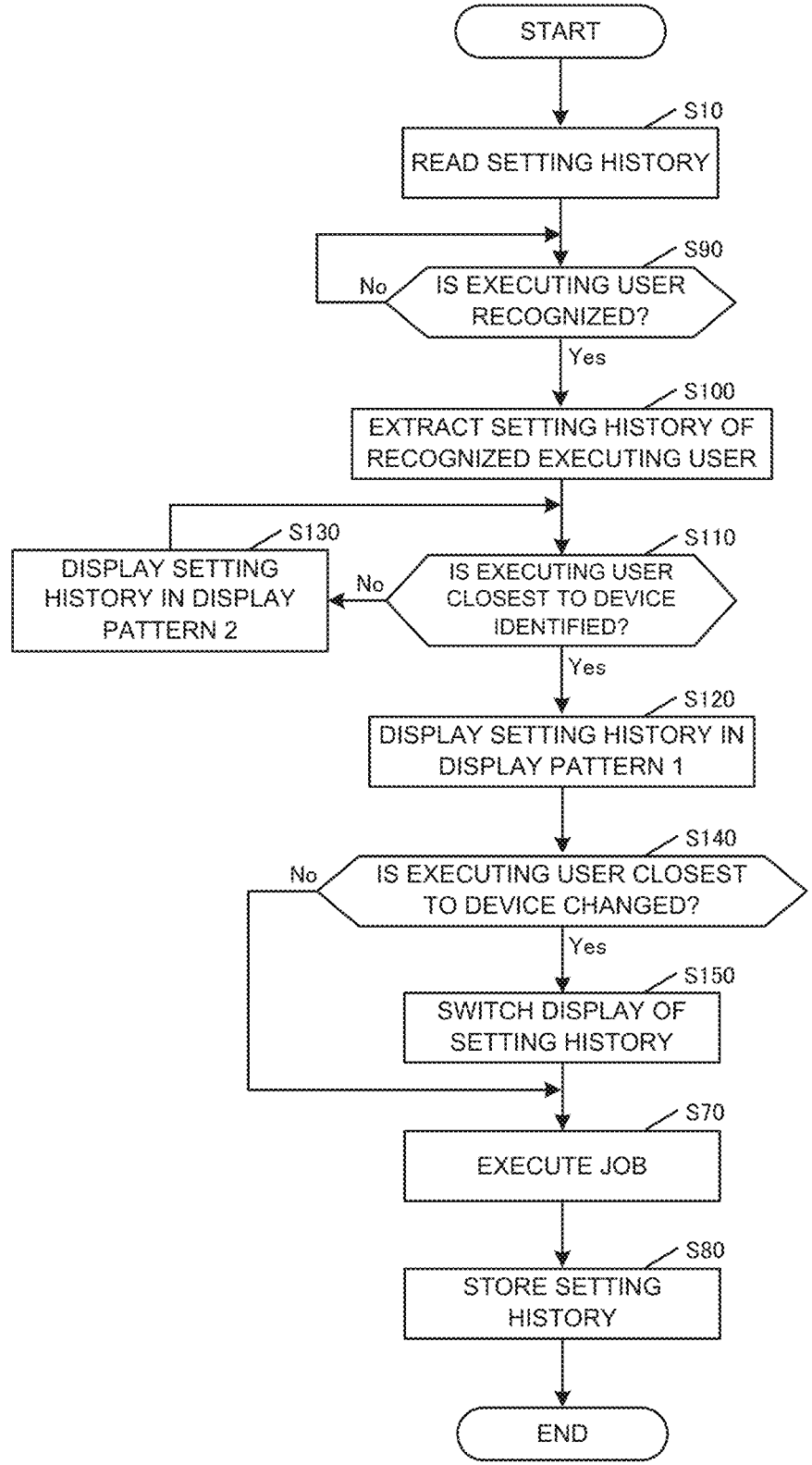
FIG. 15 is a flowchart explaining a process flow of a second embodiment.

FIG. 15 is a flowchart explaining the overall process of the multifunction peripheral 10 according to the second embodiment. The process described here is executed by the controller 11 by reading the job execution program 251, the user recognition program 252, the history information processing program 253, the user authentication program 254, the display processing program 255 and the like. The same step numbers are given to the processing steps identical to those of the first embodiment described in FIG. 6.

For example, when the power is turned on or when the system is restored from sleep mode, the controller 11 reads the setting history together with the startup processing (step S10).

Next, the controller 11 reads the user recognition program 252. The controller 11 controls the recognizer 23 to determine whether the executing user located in the vicinity of the multifunction peripheral 10 is recognized (step S90).

When the executing user located in the vicinity of the multifunction peripheral 10 is recognized, the controller 11 reads the history information processing program 253 to extract the setting histories pertaining to the job executed by the executing user (step S90; Yes→step S100).

On the other hand, if no user located in the vicinity of the multifunction peripheral 10 is recognized, the controller 11 displays the login authentication screen when the user authentication function is on. When the user authentication function is off, the controller 11 displays the initial screen (for example, the home screen) and waits until the user is recognized (step S90; No).

Subsequently, the controller 11 determines whether the executing user located closest to the multifunction peripheral 10 is identified as the operating user (step S110).

If the executing user located closest to the multifunction peripheral 10 is identified as the operating user, the controller 11 displays the setting histories in display pattern 1 (step S110; Yes→step S120). Here, the display pattern 1 is a display pattern that displays the setting histories associated with the identified operating user (or users) to display the setting histories as illustrated in FIG. 6 or the like of the first embodiment.

On the other hand, if the executing user located closest to the multifunction peripheral 10 is not identified as the operating user, the controller 11 displays the setting histories of all recognized executing users extracted in step S100 in display pattern 2 (step S110; No→step S130). In this case, for example, the controller 11 may display the setting histories of all recognized executing users in chronological order from the newest in descending order, or calculate and display the display candidates from the setting histories of all users that can be recognized. In calculating the display candidates of the setting history to be displayed, the candidates can be narrowed down by slightly weighting the setting histories with the same score according to the distance between the multifunction peripheral 10 and the user.

Subsequently, the controller 11 determines whether there has been a change in the identified operating user (step S140). In other words, the controller 11 determines whether the executing user identified as the operating user located in the vicinity of the multifunction peripheral 10 has been switched with a different executing user.

When it is determined that the operating user located closest to the multifunction peripheral 10 has been changed, the controller 11 switches the display to the setting history associated with the changed executing user (step S140; Yes→step S150). When the job is executed in accordance with the displayed setting history, the controller 11 stores the setting history for that job and ends the process (step S70→step S80).

On the other hand, if it is determined that the operating user located closest to the multifunction peripheral 10 has not been changed, the controller 11 moves the process to step S70 (step S140; No→step S70). When the job is executed in accordance with the displayed setting history, the controller 11 stores the setting history for that job and ends the process (step S70→step S80).

2.3 Operation Example

Next, an operation example according to the second embodiment is described. FIGS. 16A, 16B, 17A, and 17B are examples of the display structure of the setting history display screen (display pattern 1) displayed by the controller 11 in step S110 in FIG. 15, when the executing user located closest to the multifunction peripheral 10 can be identified as the operating user.

In the second embodiment, two display modes listed below can be applied according to the identifying state of the operating user among the plurality of executing users recognized in the vicinity of the multifunction peripheral 10.

(1) The executing user located closest to the multifunction peripheral 10 is identified as the operating user, and the setting history of the operating user is displayed. When the closest operating user is switched with a different executing user, the display of the setting history is also changed accordingly.

(2) When a plurality of users is located in the vicinity of the multifunction peripheral 10 and the accuracy of identifying the operating user is not high, only the setting histories other than the setting histories pertaining to the transmission/storage job type from the setting history of the executing user to be displayed is displayed. When the operating user who clearly operates the multifunction peripheral 10 is identified, the setting history of that operating user is displayed without limitations.

Figure 16A:
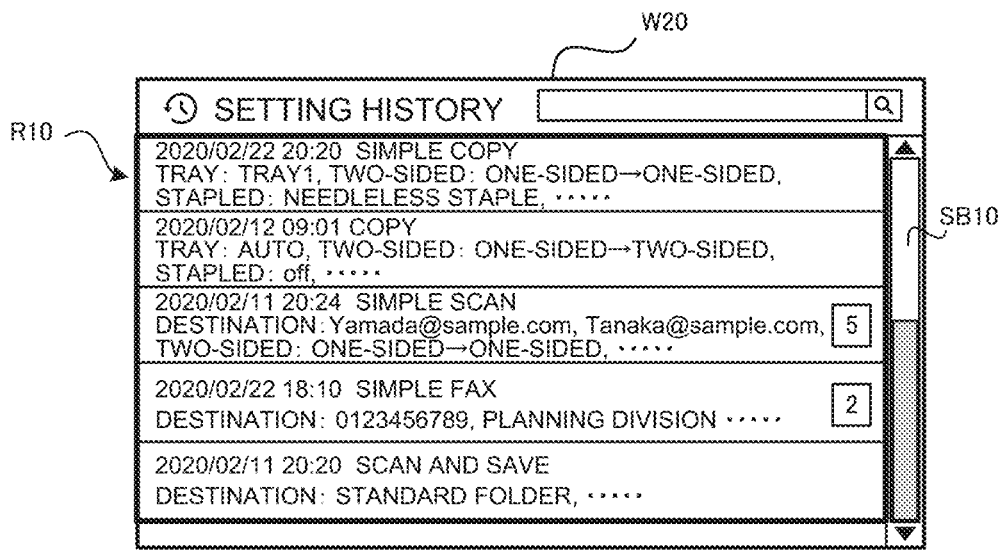
FIGS. 16A and 16B are views each explaining an operation example of the second embodiment.

FIG. 16A illustrates an example of the display structure of the setting history display screen W20 that displays the setting history of the executing user "aaaaa" who is identified as the operating user. It is assumed that the setting history display screen W20 has the same structure as the setting history display screen W20 illustrated in the first embodiment in FIG. 11.

Figure 16B:
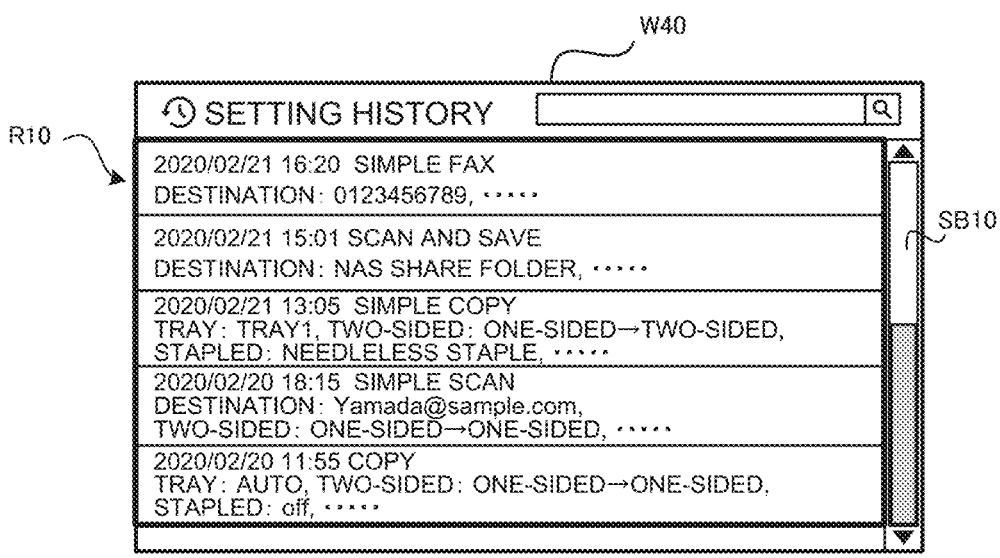

FIG. 16B illustrates the example of the display structure of a setting history display screen W40 that displays the setting history of the user "bbbbb" who is identified as the operating user when the operating user located in the vicinity of the multifunction peripheral 10 is switched with, for example, the executing user "bbbbb" from the display state illustrated in the FIG. 16A. Thus, as the operating user is switched with a different executing user, the controller 11 can also change the display of the setting history accordingly.

Figure 17A:
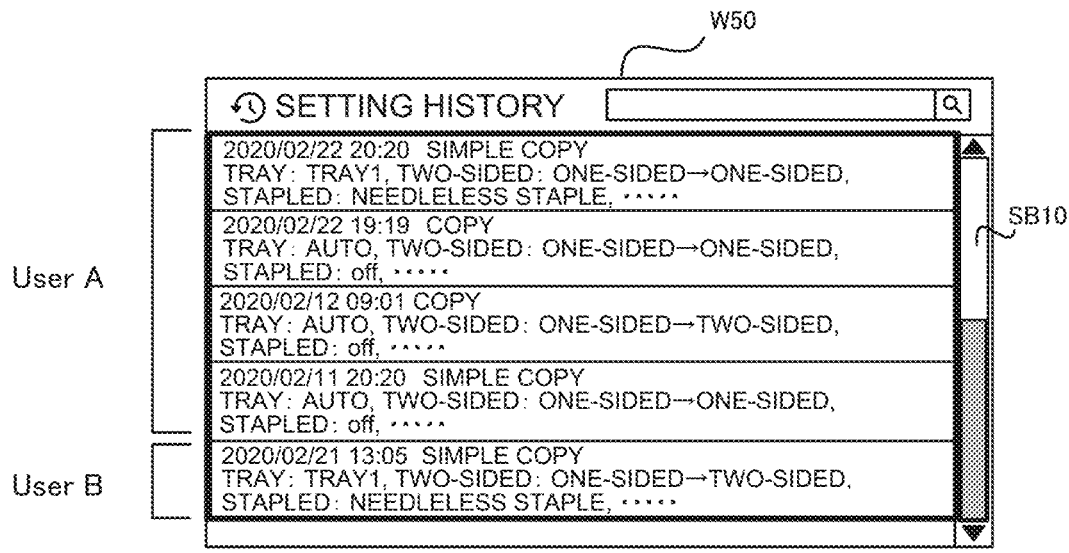
FIGS. 17A and 17B are views each explaining an operation example of the second embodiment.

FIG. 17A is an example of the display structure of a setting history display screen W50 that displays only the setting history of the displayed executing user "aaaaa" (User A) excluding the setting histories pertaining to the transmission/storage job type, when the plurality of executing users is located in the vicinity of the multifunction peripheral 10 and the identification accuracy of the operating user is not high. In this example, FIG. 17B illustrates an example of the display structure of a setting history display screen W60 that displays only the setting histories of the displayed executing user "bbbbb" (User B) excluding the setting histories pertaining to the transmission/storage job type.

Figure 17B:
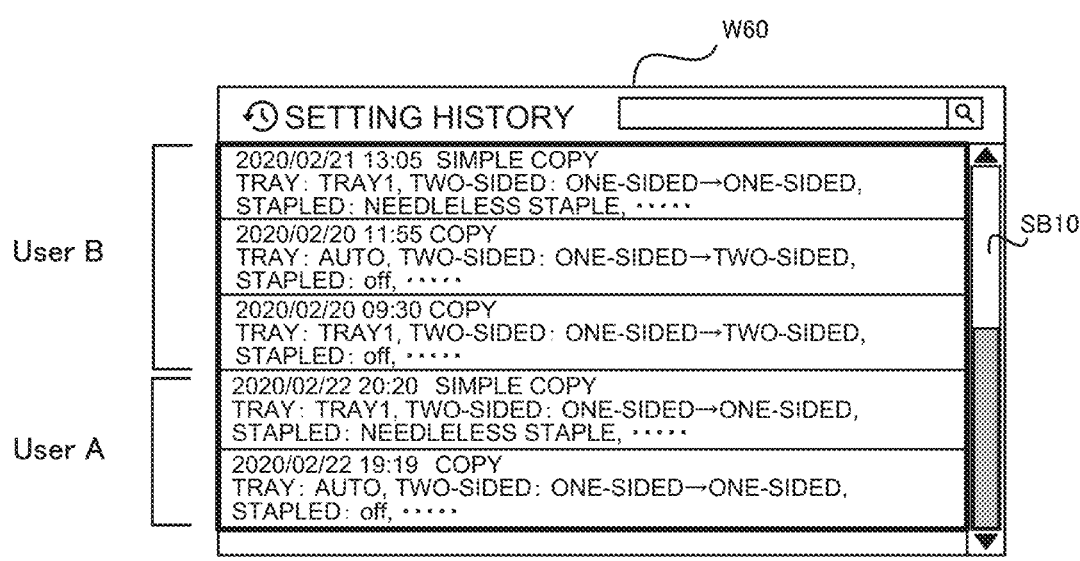

As illustrated in FIGS. 17A and 17B, in a case in which the accuracy of identification of the operating user is not high and the executing user cannot be clearly identified as the operating user, the setting histories excluding the transmission/storage job type from the setting histories of both the executing and operating users is displayed. This allows an executing user (User A) or executing user (User B) located in the vicinity of the multifunction peripheral 10 to efficiently use their own setting history, even when the identification accuracy as the operating user is not high. In this case, since the setting histories of the transmission/storage job type are not displayed to the executing user, there is no risk that destination information such as fax numbers or e-mail addresses, for example, are leaked to third parties including other executing users.

As described above, according to the second embodiment, in addition to the effect of the first embodiment, the executing user can efficiently use his/her own setting history even when the plurality of executing users is located in the vicinity of the multifunction peripheral 10 and the identification accuracy as the operating user is not high.

3 Third Embodiment

A third embodiment is a form that recalculates the display candidates when a particular operation is performed after the display candidates of the setting history is determined as described in the first embodiment.

3.1 Functional Structure

The functional structure of a multifunction peripheral according to the third embodiment can be identical to that of the multifunction peripheral 10 of the first embodiment. Therefore, the multifunction peripheral according to the third embodiment is denoted as the multifunction peripheral 10, and the detailed description of the functional structure will be omitted.

3.2 Process Flow

Figure 18:
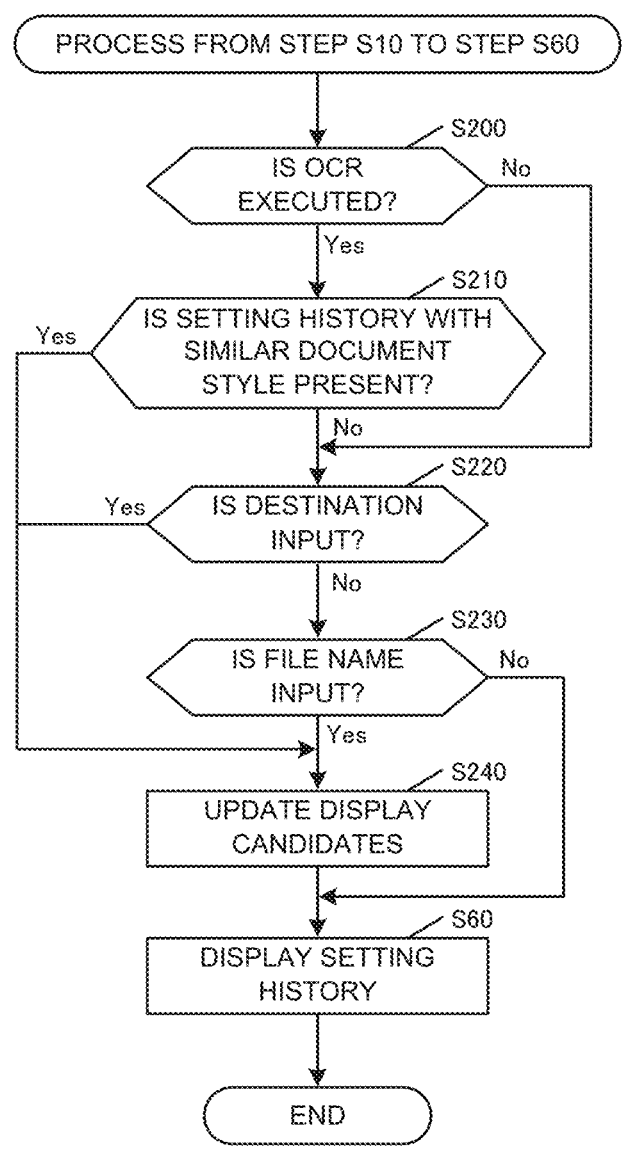
FIG. 18 is a flowchart explaining a process flow of a third embodiment.

FIG. 18 is a flowchart explaining the overall process of the multifunction peripheral 10 according to the third embodiment. The process described here is executed by the controller 11 by reading the job execution program 251, the user recognition program 252, the history information processing program 253, the user authentication program 254, the display processing program 255, and the like. Here, the process subsequent to the execution of the display process of the setting history from step S10 to step S60 of FIG. 6 according to the first embodiment will be described.

After the setting histories are displayed in step S60 of FIG. 6, the controller 11 determines whether the OCR has been performed (step S200). If it is determined that the OCR has been performed, the controller 11 determines whether the setting history having a similar document style exists (step S200; Yes→step S210). As used herein, the document style represents a document style of documents, drawings and tables, layouts, or the like represented by the image data formed by the image reader 21 by reading the image of the original in the fax job, scan job, or the like.

If it is determined that there is a setting history with a similar document style, the controller 11 updates the display candidates (step S210; Yes→step S240). The controller 11 then displays the setting histories in accordance with the update results and ends the process (step S60).

On the other hand, if it is determined that the OCR is not performed (step S200; No), or if it is determined that there is no setting history with a similar document style (step S210; No), the controller 11 determines whether the destination is entered in the transmission/storage job type (step S220).

If it is determined that the destination has been entered in the transmission/storage job type, the controller 11 moves the process to step S240 (step S220; Yes→step S240). On the other hand, if it is determined that no destination has been entered in the transmission/storage job type, the controller 11 determines whether the file name has been entered in the transmission/storage job type (step S220; No→step S230).

If it is determined that the file name has been entered in the transmission/storage job type, the controller 11 moves the process to step S240 (step S230; Yes→step S240). On the other hand, if it is determined that no file name has been entered in the transmission/storage job type, the controller 11 displays the setting histories without updating the display candidates (step S230; No→step S60).

3.3 Operation Example

Figure 19A:
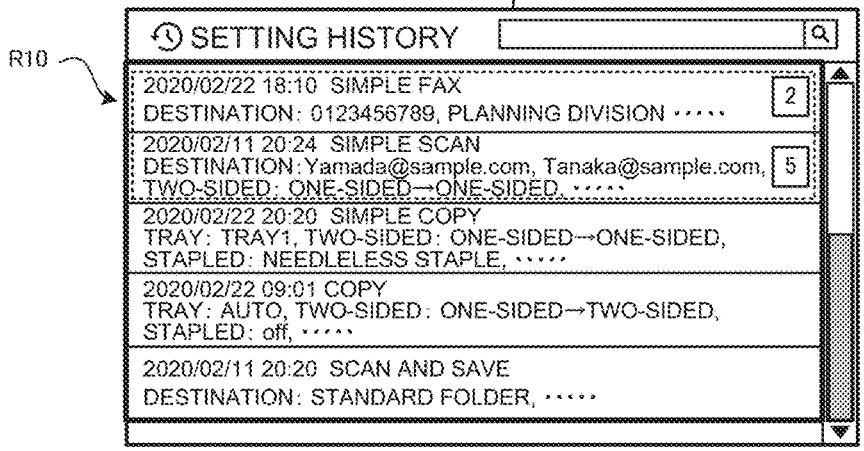
FIGS. 19A, 19B, and 19C are views each explaining an operation example of the third embodiment.

Next, an operation example according to the third embodiment is described. FIG. 19A is an example of the display structure of a setting history display screen W70 illustrating recalculation results of the display candidates of the setting history when similar setting histories exist as a result of the execution of the OCR in step S200 and step S210 of FIG. 18. It is assumed that the setting history display screen W20 illustrated in FIG. 11 has been displayed by the process up to step S60 before the execution of the OCR.

As a result of the execution of the OCR, if the setting histories having a similar document style are those pertaining to the simple fax job and the simple scan job, as illustrated in a dotted frame in FIG. 19A, the controller 11 switches the display candidates of the setting history with the setting histories according to the simple fax job and the simple scan job, as illustrated in the dotted line frame in FIG. 19A.

Figure 19B:
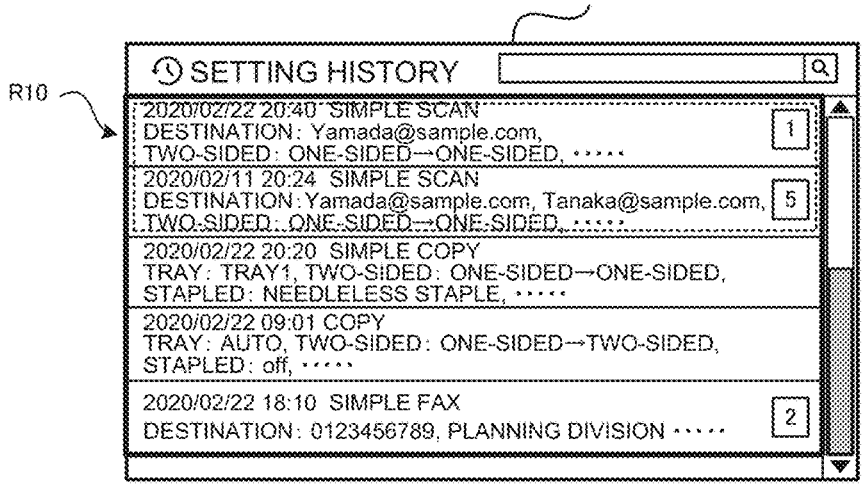

FIG. 19B is an example of the display structure of a setting history display screen W80 that displays the recalculation result of the display candidates of the setting history when the destination is entered in the transmission/storage job type in step S220 of FIG. 18.

For the transmission/storage job type, when "Yamada@sample.com" is entered as the destination, the controller 11 switches the display candidate of the setting history to the setting history according to the simple scan job, as illustrated in the dotted frame in FIG. 19B.

Figure 19C:
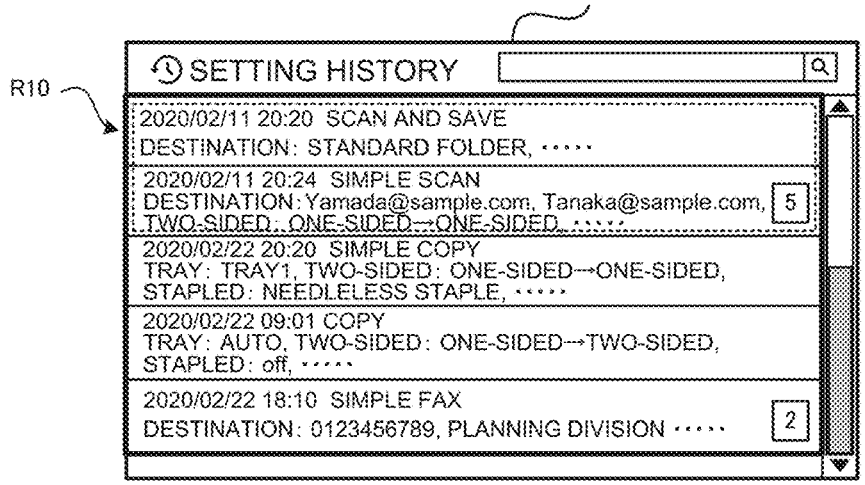

Similarly, FIG. 19C is an example of the display structure of a setting history display screen W90 that displays the recalculation result of the display candidates of the setting history when the file name is entered for the transmission/storage job type in step S230 of FIG. 18.

When the file name of the file to be saved is entered for the transmission/storage job type, as illustrated in the dotted frame in FIG. 19C, the controller 11 switches the display candidates of the setting history with the setting histories pertaining to the scan and save job and the simple scan job.

As described above, according to the third embodiment in which the display candidates are recalculated when the particular operation is performed after the display candidates of the setting history are determined as described in the first embodiment, it is possible to display appropriate setting histories corresponding to the executed particular operation.

The present disclosure is not limited to the embodiments described above, and various modifications can be made. That is, the present disclosure also includes an embodiment to be obtained by combining technical means modified as appropriate without departing from the spirit of the present disclosure.

Although the embodiments described above have been described separately for convenience of explanation, it is indeed possible to combine and implement the embodiments within the technically possible range.

The programs operating in respective devices of the embodiments are the programs that control the CPU or the like (the programs that make the computer function) so as to implement the functions of the above-described embodiments. The information handled by these devices is temporarily stored in the temporary memory (for example, RAM) during processing, and then stored in various types of read-only memories (ROM), HDD, or other storage devices, so that the information can be read, modified, and written as necessary by the CPU.

Here, a recording medium that stores the program may be, for example, any one of a semiconductor medium (for example, a ROM, a non-volatile memory card, or the like), an optical recording medium/magneto-optical recording medium (for example, a digital versatile disc (DVD), a magneto optical disc (MO), a Mini Disc (MD), a compact disc (CD), a Blu-ray (registered trademark) Disc (BD), or the like), and a magnetic recording medium (for example, a magnetic tape, a flexible disc, or the like). The functions of the present disclosure may also be realized not only by executing the loaded programs, but also processing in cooperation with the operating system, other application programs, or the like in accordance with the instructions of the programs.

When it is desired to distribute in the market, the programs may be stored in a portable recording medium for distribution or transferred to a server computer connected via a network such as the Internet. In that case, a storage device of the server computer is indeed included in the present disclosure.

What is claimed is:

1. An image processing apparatus, comprising:
    a job executer that executes a job pertaining to image processing;
    a storage capable of storing history information pertaining to the execution of the job by associating the history information with an executing user of the job;
    a display capable of displaying the history information;
    a recognizer that recognizes the executing user;
    an authenticator that authenticates the executing user via an authentication screen; and
    a controller, wherein
    when a plurality of executing users, including the executing user, is present near the image processing apparatus and when the recognizer recognizes the plurality of executing users as operating users who operate the image processing apparatus, before the executing user is authenticated, the controller displays the history information associated with the operating users on the display instead of transitioning to the authentication screen for each of the plurality of executing users,
    when an accuracy of identifying an operating user is less than a threshold accuracy, the controller excludes history information pertaining to a transmission/storage job type from the history information of the operating user to be displayed, and
    when the operating user who operates the image processing apparatus is identified with an accuracy higher than the threshold accuracy, the controller displays the history information of the operating user without limitations.

2. The image processing apparatus according to claim 1, wherein
    the controller determines the history information to be displayed on the display in accordance with a usage trend of the history information associated with the executing user when a number of pieces of the history information displayed on the display associated with the executing user exceeds a maximum number of display.

3. The image processing apparatus according to claim 1, wherein
    the controller determines the history information to be displayed on the display in accordance with a score obtained from machine learning using the history information associated with the executing user as an input value.

4. The image processing apparatus according to claim 1, wherein
    when a number of pieces of the displayed history information associated with the executing user is less than a maximum number of display, the controller displays the history information associated with another operating user as well as the history information associated with the executing user.

5. The image processing apparatus according to claim 1, wherein
    when a particular operation by the executing user is detected, the controller updates the history information to be displayed on the display.

6. The image processing apparatus according to claim 1, wherein
    the recognizer recognizes the executing user using a communication function of a terminal device.

7. The image processing apparatus according to claim 1, wherein
    the recognizer recognizes the executing user by biometric recognition.

8. The image processing apparatus according to claim 1, wherein
    when an operating user who is closest to the image processing apparatus is switched with a different executing user of the plurality of executing users, the controller also changes the displaying of the hi story information accordingly.

9. A method for displaying history information, comprising:
    executing a job pertaining to image processing;
    storing history information pertaining to the executing the job by associating the history information with an executing user of the job;
    displaying the history information;
    recognizing the executing user;
    authenticating the executing user via an authentication screen;
    when a plurality of executing users, including the executing user, is present near the image processing apparatus and the plurality of executing users is recognized as operating users who operate the image processing apparatus, displaying, before the authenticating of the executing user, the history information associated with the operating users instead of transitioning to the authentication screen for each of the plurality of executing users;
    excluding, when an accuracy of identifying an operating user is less than a threshold accuracy, history information pertaining to a transmission/storage job type from the history information of the operating user to be displayed; and
    displaying, when the operating user who operates the image processing apparatus is identified with an accuracy higher than the threshold accuracy, the history information of the operating user without limitations.

* * * * *